United States Patent
Shao et al.

(10) Patent No.: US 12,159,373 B2
(45) Date of Patent: Dec. 3, 2024

(54) IMAGE PROCESSING METHOD AND APPARATUS

(71) Applicant: Huawei Technologies Co., Ltd., Guangdong (CN)

(72) Inventors: Weihang Shao, Shenzhen (CN); Yinting Wang, Hangzhou (CN); Yifan Zhang, Hangzhou (CN); Liping Zhang, Hangzhou (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 54 days.

(21) Appl. No.: 17/934,697

(22) Filed: Sep. 23, 2022

(65) Prior Publication Data
US 2023/0014272 A1   Jan. 19, 2023

Related U.S. Application Data

(63) Continuation of application No. PCT/CN2021/071489, filed on Jan. 13, 2021.

(30) Foreign Application Priority Data

Mar. 26, 2020   (CN) .......................... 202010226094.X

(51) Int. Cl.
*G06T 5/50*   (2006.01)
*G06T 5/70*   (2024.01)
(Continued)

(52) U.S. Cl.
CPC .................. *G06T 5/50* (2013.01); *G06T 5/70* (2024.01); *G06T 5/92* (2024.01); *H04N 9/646* (2013.01);
(Continued)

(58) Field of Classification Search
CPC .... G06T 5/50; G06T 5/70; G06T 5/92; G06T 2207/20084; H04N 9/646; H04N 23/71;
(Continued)

(56) References Cited

U.S. PATENT DOCUMENTS 8,723,978 B2   5/2014   Kwon et al.
9,392,186 B2 *   7/2016   Park ...................... H04N 23/74
(Continued)

FOREIGN PATENT DOCUMENTS

CN   103856719 A   6/2014
CN   104883511 A   9/2015
(Continued)

OTHER PUBLICATIONS

Yu-Sheng Chen et al, Deep Photo Enhancer: Unpaired Learning for Image Enhancement from Photographs with GANs, CVPR 2018, 9 pages.
(Continued)

*Primary Examiner* — Michael Lee
(74) *Attorney, Agent, or Firm* — WOMBLE BOND DICKINSON (US) LLP

(57) ABSTRACT

This application discloses an image processing method and apparatus, and relates to the field of image processing technologies, to help optimize a color, a contrast, or a dynamic range of an image, so that an optimized image can be more objective, and robustness is improved. The method is applied to a terminal including a first camera and a second camera. The method includes: when an ISO of the first camera in a current photographing environment is greater than a first threshold, capturing a first image for a first scenario in the current photographing environment; capturing a second image for the first scenario; and optimizing the
(Continued)

first image based on the second image to obtain a third image. An image style of the second image is better than that of the first image.

19 Claims, 11 Drawing Sheets

(51) Int. Cl.
    *G06T 5/92*      (2024.01)
    *H04N 9/64*      (2023.01)
    *H04N 23/71*     (2023.01)
    *H04N 23/72*     (2023.01)
    *H04N 23/90*     (2023.01)
(52) U.S. Cl.
    CPC ............. *H04N 23/71* (2023.01); *H04N 23/72* (2023.01); *G06T 2207/20084* (2013.01); *H04N 23/90* (2023.01)
(58) Field of Classification Search
    CPC ...... H04N 23/72; H04N 23/90; H04N 23/741; H04N 23/13; H04N 23/81; H04N 23/951; G06N 3/045; G06N 3/0464; G06N 3/063; G06N 3/02
    See application file for complete search history.

(56) References Cited

U.S. PATENT DOCUMENTS

| | | | |
|---|---|---|---|
| 10,911,677 B1* | 2/2021 | Zhou | H04N 23/90 |
| 11,170,524 B1* | 11/2021 | Mishra | B64C 39/024 |
| 2010/0271511 A1* | 10/2010 | Ma | H04N 13/25 |
| | | | 382/254 |
| 2016/0007008 A1* | 1/2016 | Molgaard | H04N 23/58 |
| | | | 348/47 |
| 2017/0006277 A1* | 1/2017 | D'Amico | H04N 13/243 |
| 2017/0094187 A1* | 3/2017 | Sharma | G03B 5/02 |
| 2017/0349534 A1* | 12/2017 | Kadam | C07C 225/16 |
| 2017/0374281 A1 | 12/2017 | Kim et al. | |
| 2018/0070018 A1 | 3/2018 | Bian et al. | |
| 2018/0332223 A1* | 11/2018 | Lin | H04N 23/71 |
| 2019/0335150 A1 | 10/2019 | Shin | |
| 2021/0100448 A1* | 4/2021 | Hurst | G06T 5/50 |

FOREIGN PATENT DOCUMENTS

| | | |
|---|---|---|
| CN | 105208259 A | 12/2015 |
| CN | 105530436 A | 4/2016 |
| CN | 106454077 A | 2/2017 |
| CN | 106454131 A | 2/2017 |
| CN | 106534633 A | 3/2017 |
| CN | 106713762 A | 5/2017 |
| CN | 106851122 A | 6/2017 |
| CN | 106911892 A | 6/2017 |
| CN | 108198161 A | 6/2018 |
| CN | 108337449 A | 7/2018 |
| CN | 108391035 A | 8/2018 |
| CN | 108876753 A | 11/2018 |
| CN | 109064415 A | 12/2018 |
| CN | 109379522 A | 2/2019 |
| CN | 109672827 A | 4/2019 |
| CN | 110430360 A | 11/2019 |
| CN | 110855957 A | 2/2020 |
| CN | 110868548 A | 3/2020 |
| EP | 3531689 A1 | 8/2019 |
| JP | 2020042578 A | 3/2020 |

OTHER PUBLICATIONS

Micha L Gharbi et al, Deep Bilateral Learning for Real-Time Image Enhancement, ACM Transactions on Graphics, vol. 36, No. 4, Article 118. Publication date: Jul. 2017, 12 pages.

* cited by examiner

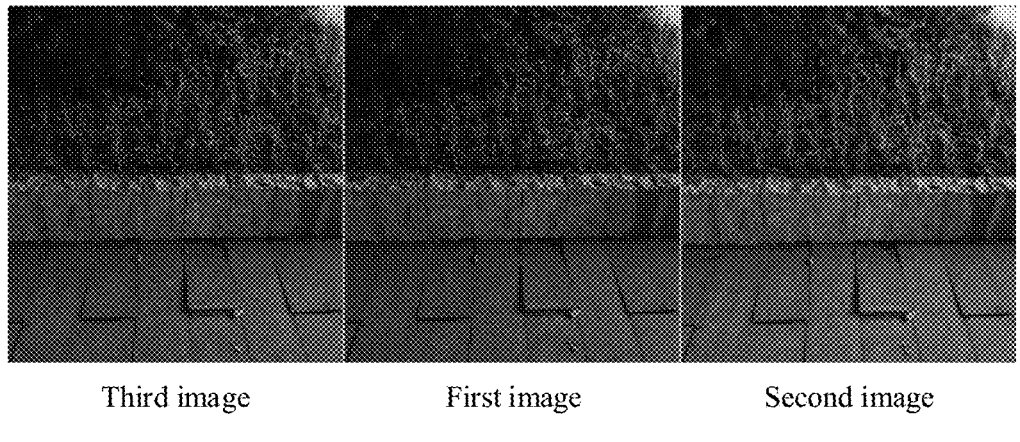

Third image      First image      Second image

FIG. 8B

A terminal separately performs feature extraction on a first image and a second image to obtain a first tensor and a second tensor, where the first tensor is used to represent texture information and color and brightness information of the first image; and the second tensor is used to represent texture information and color and brightness information of the second image — S51

The terminal performs, based on feature dimensions of the first tensor and the second tensor, a concat operation (concat) on the first tensor and the second tensor, to obtain a target tensor, or performs a subtraction operation on the first tensor and the second tensor, to obtain the target tensor — S52

The terminal optimizes the first image by using a second neural network and the second image, to obtain a third image, where the second neural network is used to perform image style optimization on an image with a poor image style by using an image with a good image style — S53

FIG. 9

IMAGE PROCESSING METHOD AND APPARATUS

CROSS-REFERENCE TO RELATED APPLICATIONS

This application is a continuation of International Application No. PCT/CN2021/071489, filed on Jan. 13, 2021, which claims priority to Chinese Patent Application No. 202010226094.X, filed on Mar. 26, 2020. The disclosures of the aforementioned applications are hereby incorporated by reference in their entireties.

TECHNICAL FIELD

This application relates to the field of image processing technologies, and in particular, to an image processing method and apparatus.

BACKGROUND

During photographing, optimization of image colors has always been a hot topic in research and commercial use. Currently, color optimization is usually performed based on a single frame of image, to be specific, a color of the photographed image is optimized based on a feature of the photographed image. This method lacks capturing of objective environment information. As a result, it is difficult to ensure objectivity and controllable robustness. In other words, final effect is prone to "deviation and distortion", resulting in poor user experience.

SUMMARY

Embodiments of this application provide an image processing method and apparatus, to help optimize a color, a contrast, or a dynamic range of an image, so that an optimized image can be more objective, and robustness is improved.

To achieve the foregoing objective, this application uses the following technical solutions.

According to a first aspect, an image processing method is provided. The method is applied to a terminal. The terminal includes a first camera and a second camera. A ratio of the first camera is not less than a ratio of the second camera. The method includes: when a light sensitivity ISO of the first camera in a current photographing environment is greater than a first threshold, capturing a first image for a first scenario in the current photographing environment by using the first camera; capturing a second image for the first scenario by using the second camera; and optimizing the first image based on the second image to obtain a third image. When a color of the second image is better than a color of the first image, a color of the third image is better than the color of the first image (condition 1). Alternatively, when a contrast of the second image is higher than a contrast of the first image, a contrast of the third image is higher than the contrast of the first image (condition 2). Alternatively, when a dynamic range of the second image is larger than a dynamic range of the first image, a dynamic range of the third image is larger than the dynamic range of the first image (condition 3). It should be noted that at least two of the condition 1, the condition 2, and the condition 3 may be met at the same time.

In this technical solution, the terminal optimizes the first image by using the second image whose color is better than that of the first image, whose contrast is higher than that of the first image, or whose dynamic range is larger than that of the first image in a same scenario. Capturing of objective environment information is considered. Therefore, compared with a technical solution in the conventional technology in which a color is optimized by using a single frame of image, in this embodiment, an optimized image can represent a real scenario more objectively. In addition, robustness is improved.

In an embodiment, the color of the second image being better than the color of the first image includes at least one of the following conditions: Chrominance of the second image is greater than chrominance of the first image; and luminance of the second image is greater than luminance of the first image.

In an embodiment, image content of the third image being the same as (or approximately the same as) image content of the first image may be represented as that texture information of the third image is the same as (or approximately the same as) texture information of the first image. This can ensure that the texture information remains unchanged or changes slightly while at least one of the color, the contrast, or the dynamic range of the first image is optimized, so that texture of the image is closer to texture in a real scenario, to improve effect of the image and improve user experience.

In an embodiment, photosensitive performance of the second camera is higher than photosensitive performance of the first camera. This helps make at least one of the color, the contrast, or the dynamic range of the second image better than that of the first image.

In an embodiment, an aperture of the second camera is greater than an aperture of the first camera. This helps make at least one of the color, the contrast, or the dynamic range of the second image better than that of the first image.

In an embodiment, exposure duration when the second camera captures the second image is greater than exposure duration when the first camera captures the first image. This helps make at least one of the color, the contrast, or the dynamic range of the second image better than that of the first image.

In an embodiment, an ISO used when the second camera captures the second image is greater than an ISO used when the first camera captures the first image. This helps make at least one of the color, the contrast, or the dynamic range of the second image better than that of the first image.

In an embodiment, a ratio range of the second camera is [0.5, 1), and a ratio range of the first camera is [1, 20]. For example, the second camera is a wide-angle camera, and the first camera is a 1X camera, a 3X camera, or a 10X camera.

In an embodiment, a ratio of the second camera is 1, and a ratio range of the first camera is (1, 20]. For example, the second camera is a 1X camera, and the first camera is a 3X camera or a 10X camera.

In an embodiment, the method further includes: capturing N frames of images for the first scenario by using the first camera, where N is an integer greater than or equal to 1; and performing multi-frame noise reduction (or multi-frame fusion) based on the N frames of images and the first image to obtain a fourth image. Image content of the fourth image is the same as the image content of the first image. In this case, the optimizing the first image based on the second image, to obtain a third image includes: optimizing the fourth image based on the second image, to obtain the third image. In other words, the terminal may optimize an image obtained by fusing a plurality of images photographed by a same camera, to obtain the third image.

In an embodiment, the method further includes: respectively capturing N1 frames of images and N2 frames of images for the first scenario by using the first camera and the second camera, where both N1 and N2 are integers greater than or equal to 1; and performing multi-frame noise reduction (or multi-frame fusion) based on the N1 frames of images, the N2 frames of images, and the first image to obtain a fifth image. Image content of the fifth image is the same as the image content of the first image. In this case, the optimizing the first image based on the second image, to obtain a third image includes: optimizing the fifth image based on the second image, to obtain the third image. In other words, the terminal may optimize an image obtained by fusing a plurality of images photographed by different cameras, to obtain the third image.

In an embodiment, the method further includes: when a zooming ratio of the terminal for the first scenario is within [1, A), selecting a camera whose ratio is 1 in the terminal as the first camera; when a zooming ratio of the terminal for the first scenario is within [A, B), selecting a camera whose ratio is A in the terminal as the first camera; or when a zooming ratio of the terminal for the first scenario is greater than C, selecting a camera whose ratio is C in the terminal as the first camera.

For example, when the zooming ratio of the terminal for the first scenario is within [1, 3), the camera whose ratio is 1 in the terminal is selected as the first camera. Alternatively, when the zooming ratio of the terminal for the first scenario is within [3, 7), a camera whose ratio is 3 in the terminal is selected as the first camera. Alternatively, when the zooming ratio of the terminal for the first scenario is greater than 10, a camera whose ratio is 10 in the terminal is selected as the first camera.

In an embodiment, the terminal further includes a third camera. The third camera is a camera that is in the terminal and that is different from the first camera and the second camera. A ratio of the third camera is not greater than the ratio of the first camera. The method further includes: respectively capturing N3 frames of images and N4 frames of images for the first scenario by using the first camera and the third camera, where both N3 and N4 are integers greater than or equal to 1; and performing multi-frame noise reduction (or multi-frame fusion) based on the N3 frames of images, the N4 frames of images, and the first image to obtain a sixth image. Image content of the sixth image is the same as the image content of the first image. In this case, the optimizing the first image based on the second image, to obtain a third image includes: optimizing the sixth image based on the second image, to obtain the third image. In other words, the terminal may optimize an image obtained by fusing a plurality of images photographed by at least three cameras, to obtain the third image.

In an embodiment, the method further includes: when a zooming ratio of the terminal for the first scenario is within [7, 10), selecting a camera whose ratio is 10 in the terminal as the first camera, and selecting a camera whose ratio is 3 in the terminal as the third camera.

In an embodiment, the method further includes: when the zooming ratio of the terminal for the first scenario is within [1, A), selecting a camera whose ratio is 1 or less than 1 in the terminal as the second camera; when the zooming ratio of the terminal for the first scenario is within [A, B), selecting a camera whose ratio is less than or equal to A in the terminal as the second camera; or when the zooming ratio of the terminal for the first scenario is greater than C, selecting a camera whose ratio is less than or equal to C in the terminal as the second camera.

For example, when the zooming ratio of the terminal for the first scenario is within [1, 3), a camera whose ratio is 1 or less than 1 in the terminal is selected as the second camera.

Alternatively, when the zooming ratio of the terminal for the first scenario is within [3, 7), a camera whose ratio is 3, 1, or less than 1 in the terminal is selected as the second camera.

Alternatively, when the zooming ratio of the terminal for the first scenario is within [7, 10), a camera whose ratio is 3, 1, or less than 1 in the terminal is selected as the second camera.

Alternatively, when the zooming ratio of the terminal for the first scenario is greater than 10, a camera whose ratio is 10, 3, 1, or less than 1 in the terminal is selected as the second camera.

In an embodiment, the optimizing the first image based on the second image, to obtain a third image includes: obtaining color correction matrices CCMs of at least two sub-images in the first image, where the at least two sub-images include a first sub-image, a CCM matrix of the first sub-image is used to represent a mapping relationship between a feature of the first sub-image and a feature of a second sub-image in the second image, the first sub-image and the second sub-image are images of a same object, and the feature includes at least one of a color, a contrast, or a dynamic range: obtaining a CCM matrix of a pixel in the first image based on the CCM matrices of the at least two sub-images, where the first image includes a first pixel, a CCM matrix of the first pixel is used to represent a mapping relationship between a feature of the first pixel and a feature of a second pixel in the second image, and the first pixel and the second pixel correspond to same image content; and obtaining the third image based on the first image and the CCM matrix of the pixel in the first image. The CCM matrix of each sub-image is first determined, and then the CCM matrix of each pixel is obtained through interpolation by using a conventional method. This helps reduce implementation complexity, to reduce calculation time, and effectively control performance overheads.

The first pixel and the second pixel corresponding to the same image content may be understood as follows: After the first image and the second image are registered, a location of the first pixel in the first image is the same as (or approximately the same as) a location of the second pixel in the second image.

In an embodiment, the obtaining CCM matrices of at least two sub-images in the first image includes: obtaining the CCM matrices of the at least two sub-images by using a first neural network. The first neural network is used to analyze a feature and texture information of the first image and a feature and texture information of the second image, to obtain the CCM matrices of the at least two sub-images.

In an embodiment, the optimizing the first image based on the second image, to obtain a third image includes:
optimizing the first image by using a second neural network and the second image, to obtain the third image. The second neural network is used to perform image style optimization on an image with a poor image style by using an image with a good image style. In this way, an optimization result is better.

According to a second aspect, an image processing method is provided. The method is applied to a terminal. The terminal includes a first camera and a second camera. A ratio of the first camera is not less than a ratio of the second camera. The method includes: when a light sensitivity ISO of the first camera in a current photographing environment is greater than a first threshold, capturing a first image for a first scenario in the current photographing environment by using the first camera; and capturing a second image for the first scenario by using the second camera, where a color of the second image is closer to a real color of the first scenario than a color of the first image; and optimizing the first image based on the second image to obtain a third image. A color of the third image is closer to the real color of the first scenario than the color of the first image. This embodiment is particularly applicable to a scenario in which a color of a photographed image greatly differs from a color of a real scenario, that is, a color cast phenomenon occurs. In this scenario, a color of an optimized image is closer to the color of the real scenario than a color of a to-be-optimized image.

In an embodiment, the second image and the first image meet at least one of the following conditions: Chrominance of the second image is closer to real chrominance of the first scenario than chrominance of the first image; and luminance of the second image is closer to real luminance of the first scenario than luminance of the first image.

In any embodiment of the first aspect, some or all of the provided features may be used as possible designs of the second aspect if there is no conflict. For example, image content of the third image is the same as (or approximately the same as) image content of the first image. For example, photosensitive performance of the second camera is higher than photosensitive performance of the first camera. For example, an aperture of the second camera is greater than an aperture of the first camera. For example, exposure duration when the second camera captures the second image is greater than exposure duration when the first camera captures the first image. For example, an ISO used when the second camera captures the second image is greater than an ISO used when the first camera captures the first image. For example, a ratio range of the second camera is [0.5, 1), and a ratio range of the first camera is [1, 20]. For example, a ratio of the second camera is 1, and a ratio range of the first camera is (1, 20]. For example, the second image is used to optimize a fourth image, a fifth image, or a sixth image. For example, when the first image is optimized, a CCM matrix of a sub-image in the first image is first calculated, interpolation is performed to obtain a CCM matrix of a pixel in the first image, and then the first image is optimized based on the CCM matrix of the pixel. For example, a neural network is directly used to optimize the first image.

According to a third aspect, an image processing apparatus is provided. The apparatus may be a terminal, a chip, or a chip system.

In an embodiment, the apparatus may be configured to perform any method provided in the first aspect or the second aspect. In this application, the apparatus may be divided into functional modules according to any method provided in the first aspect. For example, each functional module may be obtained through division based on a corresponding function, or two or more functions may be integrated into one processing module. For example, in this application, the apparatus may be divided into a processing unit, a sending unit, and the like based on functions. For descriptions of possible technical solutions performed by the foregoing functional modules obtained through division and beneficial effect achieved by the foregoing functional modules, refer to the technical solutions provided in the first aspect or the second aspect, or corresponding possible designs of the first aspect or the second aspect. Details are not described herein again.

In another possible design, the apparatus includes: a memory and one or more processors. The memory is configured to store computer instructions, and the processor is configured to invoke the computer instructions to perform any method provided in the first aspect and any one of the embodiments of the first aspect or the method provided in the second aspect and any one of the embodiments of the second aspect.

According to a fourth aspect, a terminal is provided, including a processor, a memory, and at least two cameras. The at least two cameras are configured to photograph an image. The memory is configured to store a computer program and instructions. The processor is configured to invoke the computer program and the instructions to cooperatively perform any method provided in the first aspect or the second aspect with the at least two cameras.

According to a fifth aspect, this application provides a computer-readable storage medium, for example, a non-transient computer-readable storage medium. The computer-readable storage medium stores a computer program (or instructions). When the computer program (or the instructions) is/are run on a computer, the computer is enabled to perform any method according to any one of the embodiments of the first aspect or the second aspect.

According to a sixth aspect, a computer program product is provided. When the computer program product runs on a computer, any method according to any one of the embodiments of the first aspect or the second aspect is performed.

It may be understood that any image processing apparatus, computer storage medium, computer program product, chip system, or the like provided above may be applied to the corresponding methods provided above. Therefore, for beneficial effect that can be achieved by any imaging processing apparatus, computer storage medium, computer program product, chip system, or the like, refer to the beneficial effect in the corresponding methods. Details are not described herein again.

In this application, a name of the image processing apparatus or each functional module does not constitute a limitation on devices or functional modules. During actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

BRIEF DESCRIPTION OF DRAWINGS

FIG. 8B is a schematic diagram of comparison between a first image, a second image, and a third image when the first image is optimized based on a CCM matrix according to an embodiment of this application;

FIG. 9 is a flowchart of another method for optimizing a first image according to an embodiment of this application:

DESCRIPTION OF EMBODIMENTS

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "example" or the like is intended to present a related concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise specified, "a plurality of" means two or more than two.

An image processing method provided in embodiments of this application may be applied to a terminal. The terminal may be a terminal with a camera, such as a smartphone, a tablet computer, a wearable device, or an AR/VR device, or may be a device, such as a personal computer (PC), a personal digital assistant (PDA), or a netbook, or may be any other terminal that can implement embodiments of this application. A specific form of the terminal is not limited in this application. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

Figure 1:
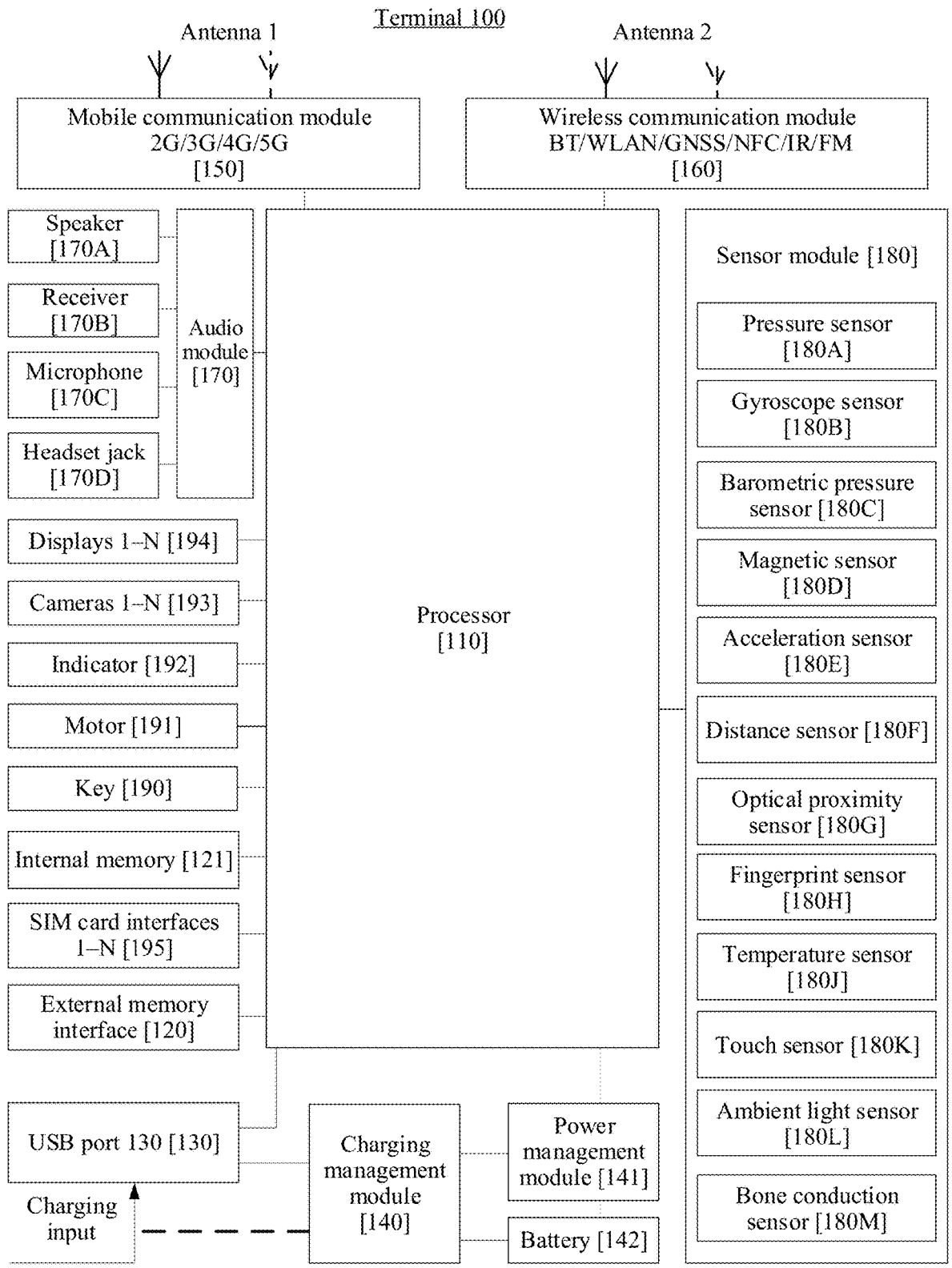
FIG. 1 is a schematic diagram of a hardware structure of a terminal applicable to an embodiment of this application.

In this application, a structure of the terminal may be shown in FIG. 1. As shown in the FIG. 1, the terminal 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The terminal 100 may include one or more cameras 193. If the terminal 100 includes one camera, in this embodiment of this application, the camera is supported to operate in different operating states. For specific descriptions of the operating states, refer to the following description. If the terminal 100 includes a plurality of cameras, the plurality of cameras may have different ratios. The plurality of cameras include a first camera and a second camera that are described in this embodiment of this application.

It may be understood that an example structure in this embodiment does not constitute a specific limitation on the terminal 100. In some other embodiments, the terminal 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. For example, in this application, when a light sensitivity (ISO) of the first camera in a first scenario is greater than a first threshold, the processor 110 may control the first camera to capture a first image for the first scenario, control the second camera to capture a second image for the first scenario, and optimize the first image based on the second image to obtain a third image. Refer to the following description for additional details.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be a mini USB port, a micro USB port, a USB Type C port, or the like. The USB port 130 may be configured to connect to a charger to charge the terminal 100, may be configured to transmit data between the terminal 100 and a peripheral device, or may be configured to connect to a headset, to play audio by using the headset. The interface may be further configured to connect to another terminal such as an AR device.

It may be understood that an interface connection relationship between the modules that is shown in this embodiment is merely an example for description, and does not constitute a limitation on the structure of the terminal 100. In some other embodiments of this application, the terminal 100 may alternatively use an interface connection mode different from that in the foregoing embodiment, or a combination of a plurality of interface connection modes.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal 100 may be implemented by using the antenna 1, the antenna 2, the mobile communication module 150, the wireless communication module 160, the modem processor, the baseband processor, and the like.

The terminal 100 implements the display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

A series of graphical user interfaces (GUIs) may be displayed on the display 194 of the terminal 100. These GUIs are all home screens of the terminal 100. Generally, a size of the display 194 of the terminal 100 is fixed, and limited controls can be displayed only on the display 194 of the terminal 100. The control is a GUI element, is a software component, which is included in an application and controls all data processed by the application and interaction operations related to the data. A user may interact with the control through direct manipulation, to read or edit related information of the application. Generally, controls may include visual interface elements such as an icon, a button, a menu, a tab, a text box, a dialog box, a status bar, a navigation bar, and a widget.

The terminal 100 can implement a photographing function by using the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to a digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the terminal 100 may be implemented by using the NPU, for example, image recognition, facial recognition, speech recognition, and text understanding.

The external memory interface 120 may be configured to connect to an external memory card such as a micro SD card, to extend a storage capability of the terminal 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the terminal 100. For example, in this embodiment, the processor 110 may execute the instructions stored in the internal memory 121, to obtain a pose of the terminal 100. The internal memory 121 may include a program storage area and a data storage area. The program storage area may store an operating system, an application required by at least one function (for example, a sound playing function or an image playing function), and the like. The data storage area may store data (for example, audio data and a phone book) created during use of the terminal 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to execute various function applications of the terminal 100 and data processing.

The terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may be used to listen to music or answer a call in a hands-free mode over the speaker 170A.

The receiver 170B, also referred to as an "earpiece", is configured to convert an audio electrical signal into a sound signal. When a call is answered or a voice message is listened to by using the terminal 100, the receiver 170B may be put close to a human ear to listen to voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to capture a sound signal and further implement a noise reduction function. In some other embodiments, three, four, or more microphones 170C may alternatively be disposed in the terminal 100, to capture a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects touch operation intensity by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyroscope sensor 180B may be configured to determine a motion posture of the terminal 100. In some embodiments, angular velocities of the terminal 100 around three axes (namely, x, y, and z axes) may be determined by using the gyroscope sensor 180B. The gyroscope sensor 180B may be configured to implement image stabilization during photographing. For example, when the shutter is opened, the gyroscope sensor 180B detects an angle at which the terminal 100 shakes, calculates, based on the angle, a distance for which a lens module needs to compensate, and allows the lens to cancel the shake of the terminal 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a flip phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may further be configured to identify a posture of the terminal, and is used in an application such as a pedometer or screen switching between a landscape mode and a portrait mode.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario.

The optical proximity sensor 180G may include, for example, a light-emitting diode (LED) and an optical detector, for example, a photodiode. The light-emitting diode may be an infrared light-emitting diode. The terminal 100 emits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a leather case mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the terminal 100 is in a pocket to prevent an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch control device". The touch sensor 180K may be disposed in the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided through the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effect. The motor 191 may also correspond to different vibration feedback effect for touch operations performed on different areas of the display 194. Different application scenarios (for example, time reminding, information receiving, an alarm clock, and a game) may also correspond to different vibration feedback effect. Touch vibration feedback effect may be further customized.

The indicator 192 may be an indicator light, and may be configured to indicate a charging status and a power change, or may be configured to indicate a message, a missed call, a notification, and the like.

In addition, an operating system runs above the foregoing components, for example, an iOS operating system developed by Apple, an Android open-source operating system developed by Google, and a Windows operating system developed by Microsoft. An application may be installed and run on the operating system.

An operating system of the terminal 100 may use a layered architecture, an event-driven architecture, a microkernel architecture, a microservice architecture, or a cloud architecture. In embodiments of this application, an Android system with a hierarchical architecture is used as an example to describe a software structure of the terminal 100.

Figure 2:
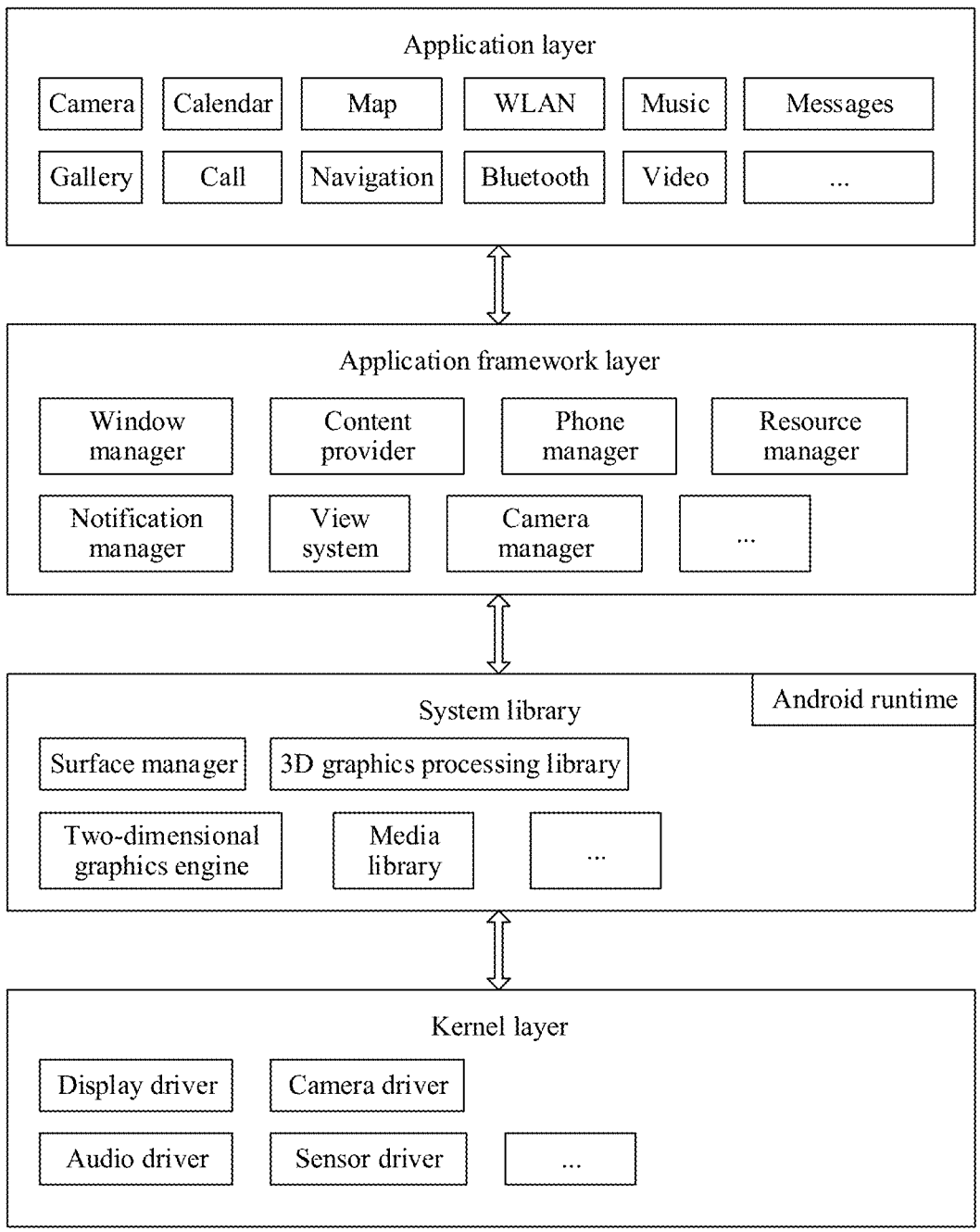
FIG. 2 is a block diagram of a software structure of a terminal applicable to an embodiment of this application.

FIG. 2 is a block diagram of a software structure of the terminal 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages. As shown in FIG. 2, the application packages may include applications such as Camera, Gallery, Calendar, Phone, Map, Navigation, WLAN, Bluetooth, Music, Videos, and SMS Messages. For example, during photographing, the camera application may access a camera interface management service provided by the application framework layer.

The application framework layer provides an application programming interface (API) and a programming framework for an application at the application layer. The application framework layer includes some predefined functions. As shown in FIG. 2, the application framework layer may include a window manager, a content provider, a view system, a phone manager, a resource manager, a notification manager, and the like. For example, in this embodiment of this application, during photographing, the application framework layer may provide an API related to a photographing function for the application layer, and provide a camera interface management service for the application layer, to implement the photographing function.

The window manager is configured to manage a window program. The window manager may obtain a size of the display, determine whether there is a status bar, lock a screen, take a screenshot, and the like.

The content provider is configured to: store and obtain data, and enable the data to be accessed by an application. The data may include a video, an image, an audio, calls that are made and answered, a browsing history, a bookmark, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view:

The phone manager is configured to provide a communication function of the terminal 100, for example, management of a call status (including connection, hang-up, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window: For example, text information is prompted in the status bar, an alert sound is played, the terminal vibrates, and the indicator light blinks.

The Android runtime includes a kernel library and a virtual machine. The Android runtime is responsible for scheduling and management of the Android system.

The kernel library includes two parts: a function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports play back and recording in a plurality of commonly used audio and video formats, static image files and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

It should be noted that, although this embodiment of this application is described by using the Android system as an example, a basic principle in this embodiment is also applicable to a terminal based on an operating system such as iOS or Windows.

The following describes a working process of software and hardware of the terminal 100 by using an example with reference to FIG. 1 and a photographing scenario.

The touch sensor 180K receives the touch operation, and reports the touch operation to the processor 110, so that the processor 110 starts a camera application in response to the touch operation, and displays a user interface of the camera application on the display 194. For example, after receiving a touch operation on the camera application icon, the touch sensor 180K reports the touch operation on the camera application to the processor 110, so that, in response to the touch operation, the processor 110 starts the camera application, and displays the user interface of the camera on the display 194. In addition, in this embodiment of this application, the terminal 100 may alternatively start the camera application in another manner, and display the user interface of the camera application on the display 194. For example, when a user interface is displayed after a black screen or unlocking or a lock screen is displayed, in response to a voice instruction or a shortcut operation of the user, the terminal 100 may start the camera application, and display the user interface of the camera application on the display 194.

When a terminal is used to perform photographing, an environmental factor of a current scenario may cause poor color and brightness effect of a photographed image. For example, color and brightness effect of an image photographed in a low light scenario, a high dynamic range scenario, or an ultra-high range scenario is poorer than color and brightness effect of an image photographed in a bright light scenario. Therefore, optimizing color and brightness effect of an image to improve user experience has been a hot topic in research and commercial use.

To resolve a problem of color and brightness optimization of an image, an embodiment of this application provides an image processing method. The method is applied to a terminal. The terminal includes a first camera and a second camera. A ratio of the first camera is greater than a ratio of the second camera. The method includes: when an ISO of the first camera in a first scenario is greater than a first threshold, capturing a first image for the first scenario by using the first camera, and capturing a second image for the first scenario by using the second camera, where a color and brightness degree of the second image is higher than a color and brightness degree of the first image; and optimizing the first image based on the second image to obtain a third image. A color and brightness degree of the third image is higher than the color and brightness degree of the first image. In this embodiment of this application, the terminal optimizes, by using an image with a higher color and brightness degree based on a same scenario, an image with a lower color and brightness degree, and capturing of objective environment information is considered. Therefore, compared with a technical solution in the conventional technology in which color and brightness are optimized by using a single frame of image, this enables an optimized image to more objectively represent a real scenario, and improves robustness.

It should be noted that in this embodiment of this application, "image style" may also be understood as "color and brightness of an image". For example, the image style (or color and brightness of an image) may include at least one of a color, a contrast, and a dynamic range of the image. For another example, that an image style of the second image is better than an image style of the first image is equivalent to that the color and brightness degree of the second image is higher than the color and brightness degree of the first image.

The following describes implementations of embodiments of this application in detail with reference to accompanying drawings.

Figure 3:
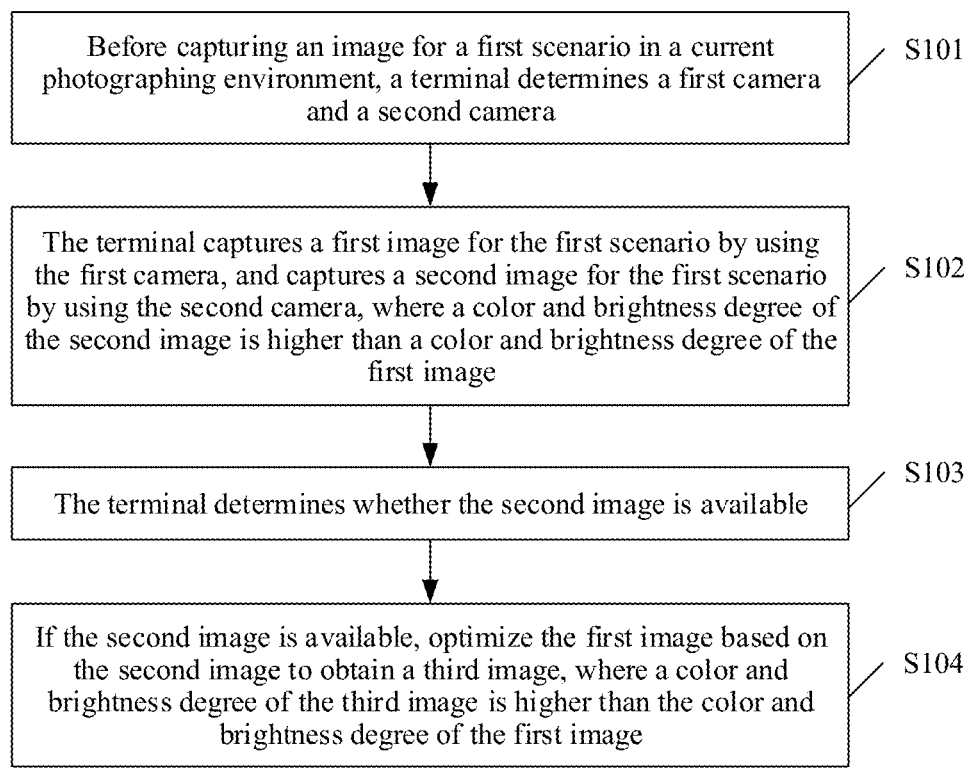
FIG. 3 is a flowchart of an image processing method according to an embodiment of this application.

FIG. 3 is a flowchart of the image processing method according to an embodiment of this application. The method shown in FIG. 3 includes the following operations.

S101. Before capturing an image for a first scenario in a current photographing environment, the terminal determines the first camera and the second camera. The first camera is configured to photograph a to-be-optimized image (for example, the first image in this application). The second camera is configured to photograph a reference image (that is, an image used in a process of optimizing the to-be-optimized image, for example, the second image in this application).

In an implementation, an ISO of the first camera in the current photographing environment is greater than the first threshold.

For a same camera, an ISO value of the camera is automatically adjusted in different environments. The first threshold is greater than or equal to an ISO value of the first camera when representing a critical state between a bright region and a dark region. A value of the first threshold is related to a specification of the first camera, a critical state for defining the bright region and the dark region, and the like. A parameter indicating a specification of a camera may include a focal length, a ratio, photosensitive performance and the like. In an example, the first threshold may be about 200.

In this implementation, generally speaking, the first scenario is a dark scenario, for example, a night scenario or a dark region scenario in daytime.

In another implementation, the first scenario is a high dynamic range scenario or an ultra-high dynamic range scenario. Specifically, if a ratio of a maximum value to a minimum value of luminance of a preview image obtained by photographing the first scenario by the first camera is greater than a threshold, it indicates that the first scenario is the high dynamic range scenario or the ultra-high dynamic range scenario.

In another implementation, the first scenario is a high-contrast scenario. Specifically, if a difference between a maximum value and a minimum value of a contrast of a preview image obtained by photographing the first scenario by the first camera is greater than a threshold, it indicates that the first scenario is the high-contrast scenario.

In another implementation, the first scenario is an abnormal scenario. The abnormal scenario herein refers to that an image obtained by photographing the first scenario cannot truly reflect the scenario because of an environmental factor or the like. For example, texture information of an object in an image obtained by photographing the scenario is distorted, or a color cast (that is, a color is changed) occurs.

It may be understood that, in this embodiment of this application, color and brightness information of an image may be optimized. Therefore, this embodiment of this application is especially applicable to a scenario with poor photographing effect, for example, the foregoing night scenario or abnormal scenario.

In an embodiment, the ratio of the first camera is greater than the ratio of the second camera.

In an implementation, a ratio range of the second camera is [0.5, 1), and a ratio range of the first camera is [1, 20]. For example, the second camera is a wide-angle camera, and the first camera is a 1X camera (that is, a camera whose ratio is 1), a 3X camera (that is, a camera whose ratio is 3), or a 10X camera (that is, a camera whose ratio is 10).

In another implementation, the ratio of the second camera is 1, and the ratio of the first camera is within a range of (1, 20]. For example, the second camera is a 1X camera, and the first camera is a 3X camera or a 10X camera.

In another implementation, the ratio of the second camera is within a range of (1, 10), and the ratio of the second camera is within a range of [10, 20]. For example, the second camera is a 3X camera, and the first camera is a 10X camera.

In an embodiment, the ratio of the first camera is equal to the ratio of the second camera. For example, the ratios of the first camera and the second camera are both less than 1, equal to 1, or greater than 1. For example, both the first camera and the second camera are wide-angle cameras, 1X cameras, 3X cameras, or 10X cameras.

The foregoing is merely an example, and constitutes no limitation on a specific value of a ratio of a camera to which this embodiment of this application is applicable.

In an embodiment, the second camera is configured to photograph a black-and-white image, and the first camera is configured to photograph a color image. For example, the second camera is a 1X camera, and the second camera is a wide-angle camera or a 1X camera. Certainly, it is not limited thereto.

Certainly, both the second camera and the first camera may be configured to photograph a color image. The following uses an example in which both the first image and the second image are color images for description. Unified description is provided herein. Details are not described below again.

In an embodiment, the terminal includes a plurality of camera. The terminal may determine the first camera and the second camera based on the following operations:

When a zooming ratio of the terminal for the first scenario is within [1, 3), select a camera whose ratio is 1 in the terminal as the first camera. In this case, a camera whose ratio is 1 or less than 1 in the terminal may be selected as the second camera.

When a zooming ratio of the terminal for the first scenario is within [3, 7), select a camera whose ratio is 3 in the terminal as the first camera. In this case, a camera whose ratio is 3, 1, or less than 1 in the terminal may be selected as the second camera.

When a zooming ratio of the terminal for the first scenario is within [7, 10), select a camera whose ratio is 10 in the terminal as the first camera. In this case, a camera whose ratio is 3, 1, or less than 1 in the terminal may be selected as the second camera.

When a zooming ratio of the terminal for the first scenario is greater than 10, select a camera whose ratio is 10 in the terminal as the first camera. In this case, a camera whose ratio is 10, 3, 1, or less than 1 in the terminal may be selected as the second camera.

More generally, when the zooming ratio of the terminal for the first scenario is within [1, A), select a camera whose ratio is 1 or a main camera in the terminal as the first camera.

Alternatively, when the zooming ratio of the terminal for the first scenario is within [A, B), select a camera whose ratio is A or a main camera in the terminal as the first camera.

Alternatively, when the zooming ratio of the terminal for the first scenario is greater than B, select a camera whose ratio is C or a main camera in the terminal as the first camera.

Alternatively, when the zooming ratio of the terminal for the first scenario is greater than C, select a camera whose ratio is C or a main camera in the terminal as the first camera.

$1<A<B<C$

After the first camera is determined, a camera whose ratio is less than or equal to the ratio of the first camera in the terminal may be selected as the second camera.

S102: The terminal captures the first image for the first scenario by using the first camera, and captures the second image for the first scenario by using the second camera. The color and brightness degree of the second image is higher than the color and brightness degree of the first image.

A photographing time interval between the first image and the second image is not limited in this embodiment of this application. For example, the photographing time interval between the first image and the second image is less than a threshold. A longer photographing time interval leads to a higher probability of occurrence of a shake, a dramatic environment change, and the like, and therefore leads to a higher probability of a large difference between content of the first image and content of the second image. Therefore, theoretically, the photographing time interval between the first image and the second image should be as short as possible. In an embodiment, the photographing time interval between the two may be several milliseconds or dozens of milliseconds.

A color and brightness degree of an image may be represented based on at least one of a color, a contrast, and a dynamic range of the image.

In an embodiment, if the second image and the first image meet a preset condition, it indicates that the color and brightness degree of the second image is higher than the color and brightness degree of the first image. The preset condition includes at least one of the following:

Condition 1: A color of the second image is better than a color of the first image.

Specifically, a color that is in the second image and that represents a pixel of an object is better than a color that is in the first image and that represents a pixel of the object, and a quantity of pixels that are in the second image and that have this feature is greater than a threshold. Generally speaking, an overall color of the second image is better than an overall color of the first image.

In an embodiment, if a signal-to-noise ratio of the color of the second image is greater than a signal-to-noise ratio of the color of the first image, it indicates that the color of the second image is better than the color of the first image.

In an embodiment, if chrominance of the second image is greater than chrominance of the first image, and/or luminance of the second image is greater than luminance of the first image, it indicates that the color of the second image is better than the color of the first image.

Condition 2: A contrast of the second image is higher than a contrast of the first image.

Condition 3: A dynamic range of the second image is larger than a dynamic range of the first image.

This embodiment of this application provides the following several implementations, to implement that the color and brightness degree of the second image is higher than the color and brightness degree of the first image.

Manner 1: Photosensitive performance of the second camera is higher than photosensitive performance of the first camera.

Photosensitive performance of a camera is an inherent feature of the camera, and is used to indicate an imaging capability of the camera. Generally, a larger area of a sensor (sensor) in a camera indicates higher photosensitive performance of the camera. In a case in which other conditions are the same, higher photosensitive performance of the camera indicates a higher color and brightness degree of a photographed image.

Manner 2: An aperture of the second camera is greater than an aperture of the first camera.

Manner 3: Exposure duration when the second camera captures the second image is greater than exposure duration when the first camera captures the first image. For example, the exposure duration when the second camera captures the second image is hundreds of milliseconds, for example, T may be about 500 milliseconds. The exposure duration when the first camera captures the second image is several milliseconds to dozens of milliseconds.

Manner 4: An ISO used when the second camera captures the second image is greater than an ISO used when the first camera captures the first image.

An optimal ISO value of the camera varies with an illumination. An optimal ISO value under a specific illumination refers to an ISO value when the color and brightness degree of an image is the highest (or the color and brightness degree reaches a specific threshold) under the illumination. An optimal ISO value under any illumination may be obtained based on an experiment. This is not limited in this embodiment of this application. Under a same illumination, when the ISO value is less than or equal to the optimal ISO value, a larger ISO value indicates a higher color and brightness degree of the photographed image. When the ISO value is greater than the optimal ISO value, a larger ISO value indicates a lower color and brightness degree of the photographed image.

The foregoing manner 1 and manner 2 may be understood as implementing, based on a hardware attribute of a camera, that the color and brightness degree of the second image is higher than the color and brightness degree of the first image. The foregoing manner 3 and manner 4 may be understood as adjusting a parameter of a camera based on software, so that the color and brightness degree of the second image is higher than the color and brightness degree of the first image. The foregoing manner 3 and manner 4 may be applicable to a case in which the photosensitive performance of the second camera is the same as or slightly different from the photosensitive performance of the first camera.

An aperture and exposure duration of a camera affect an amount of light admitted by the camera. A sensor photosensitive area and an ISO of the camera determine a light receiving capability of the camera. Generally, a larger aperture indicates longer exposure duration, a larger photosensitive area, a higher ISO, and a larger amount of light that can be finally received by the camera. However, a larger amount of received light is not always better. For a specific photographing environment, there is an exposure threshold. If an amount of received light is less than the exposure threshold, a larger amount of received light indicates better color and brightness effect of the photographed image. If an amount of received light is greater than or equal to the exposure threshold, a larger amount of received light indicates that color and brightness effect of the photographed image may deteriorate due to overexposure. In an example, the foregoing manner 3 and manner 4 may be applicable to a scenario in which the amount of the received light is less than the exposure threshold.

It should be noted that, when there is no conflict, a plurality of implementations in the foregoing manner 1 to manner 4 may be used in combination, to form a new implementation. For example, the foregoing manner 3 and manner 4 may be used in combination.

In an embodiment, S102 may be implemented in the following manner A or manner B.

Figure 4:
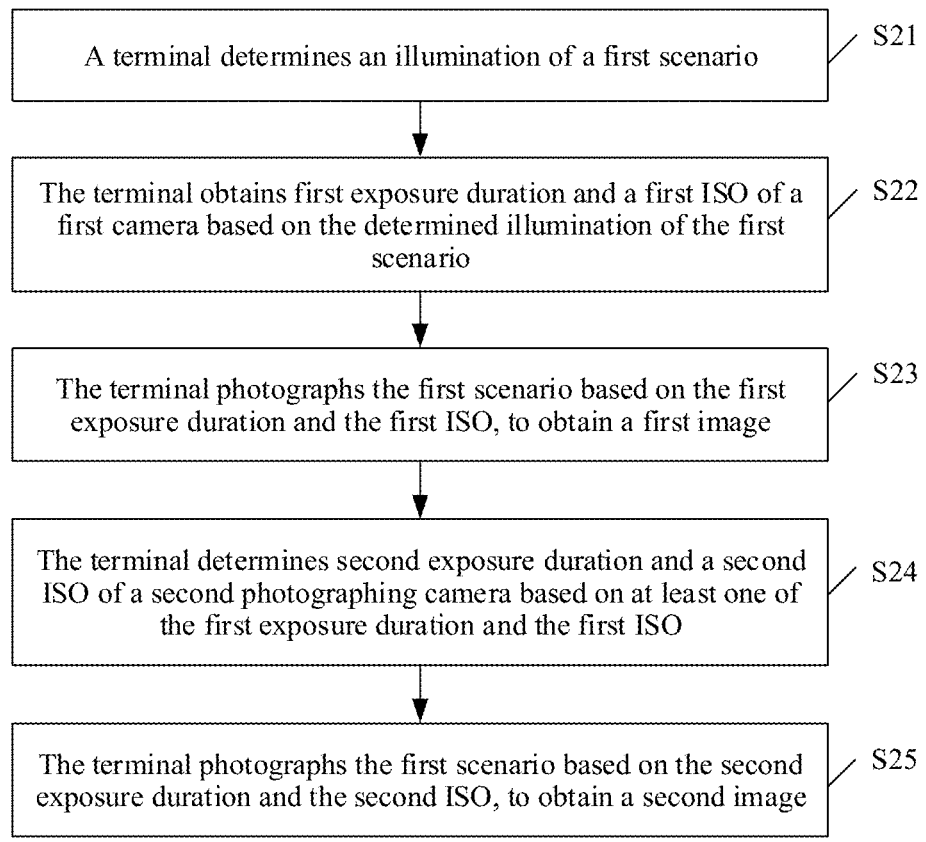
FIG. 4 is a flowchart of a method for capturing a first image and a second image according to an embodiment of this application.

Manner A: As shown in FIG. 4, S102 may include the following operations S21 to S25.

S21: A terminal determines an illumination of the first scenario.

S22: The terminal obtains first exposure duration and a first ISO of the first camera based on the determined illumination of the first scenario. Refer to the conventional technology for additional details.

S23: The terminal photographs the first scenario based on the first exposure duration and the first ISO, to obtain the first image.

S24: The terminal determines second exposure duration and a second ISO of the second photographing camera based on at least one of the first exposure duration and the first ISO.

A relationship among an exposure amount EV, exposure duration T, and an ISO of the camera satisfies: $EV=\log_2(T*ISO)$. The terminal may prestore the following association relationship: a correspondence between an exposure amount (or "exposure duration and/or ISO") of the first camera and an exposure amount (or "exposure duration and/or ISO") of the second camera, and then determine, based on the first exposure duration and the first ISO that are of the first camera and that are determined in the operation 22 and the pre-stored correspondence, the second exposure duration and the second ISO. A specific representation form of the foregoing correspondence is not limited in this embodiment of this application. For example, the correspondence may be a function relationship or a table.

In an embodiment, first, a value of $T_a$ is obtained based on a predefined correspondence between $T_a$ and $T_m$, a predefined association relationship between $T_a$ and "$T_m$, and $ISO_m$", or a predefined association relationship between $T_a$ and $ISO_m$. $T_a$ indicates the second exposure duration, $T_m$ indicates the first exposure duration, and $ISO_m$ indicates the first ISO. Then, $ISO_a$ is obtained based on a value of at least one parameter in $T_m$, $ISO_m$, and $T_a$. $ISO_a$ indicates the second ISO.

In an example, the terminal may adjust $ISO_a$, so that the exposure amount $EV_a=\log_2(T_a**ISO_m)$ of the second camera when the second image is captured is greater than the exposure amount $EV_m=\log_2(T_m*ISO_m)$ of the first camera when the first image is captured, that is, satisfies $EV_a=EV_m+f$, where f is a predefined value.

In another example, a value of $ISO_a$ is obtained based on a predefined association relationship between $ISO_a$ and $ISO_m$, or a predefined association relationship between $ISO_a$ and "$T_m$, and $ISO_m$", or a predefined association relationship between $ISO_a$ and $T_m$.

S25: The terminal photographs the first scenario based on the second exposure duration and the second ISO, to obtain the second image.

Figure 5:
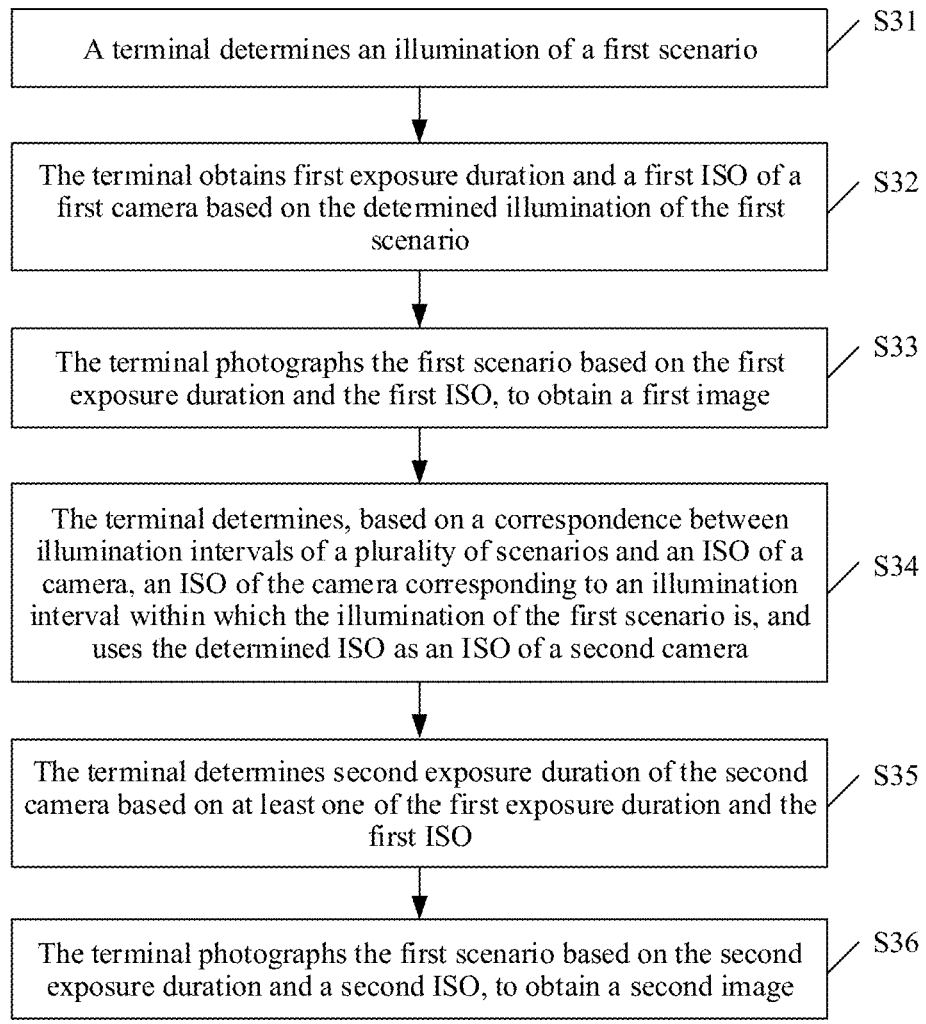
FIG. 5 is a flowchart of another method for capturing a first image and a second image according to an embodiment of this application.

Manner B: As shown in FIG. 5, S102 may include the following operations S31 to S36.

S31 to S33: Refer to S21 to S23.

S34: The terminal determines, based on a correspondence between illumination intervals of a plurality of scenarios and an ISO of a camera, an ISO of the camera corresponding to an illumination interval within which the illumination of the first scenario is, and uses the determined ISO as the ISO of the second camera.

The correspondence may be predefined. The ISO of the camera in the correspondence may be an optimal ISO value of the camera. For related descriptions of the optimal ISO value, refer to the foregoing description. Details are not described herein again.

It should be noted that, when an image is photographed based on the optimal ISO value under a specific illumination, a high color and brightness degree of the photographed image is ensured. In addition, texture information may be sacrificed, noise may be increased, and a registration degree (that is, a registration degree between different images captured in a same scenario) may be reduced. In other words, when the image is captured based on the optimal ISO value, color and brightness information of the image is recorded with high quality at the cost of sacrificing texture information, increasing noise, and reducing registration accuracy.

S35: The terminal determines the second exposure duration of the second camera based on at least one of the first exposure duration and the first ISO. Refer to the foregoing description for additional details.

S36: Refer to S25.

In an embodiment, in the manner A, when the predefined correspondence used when S24 is performed is designed, the "optimal ISO value" may be considered as a factor that affects the value of f, so that the value of the second ISO obtained by performing S24 is closer to the optimal ISO value.

It should be noted that, in the foregoing description, the first image and the second image are respectively photographed by different cameras. In addition, the first image and the second image may further be obtained in any one of the following manners:

In an implementation, the first image and the second image may be photographed by a same camera in different operating states. For example, the camera may photograph the second image when a flash is turned on, and photograph the first image when the flash is turned off. Alternatively, the camera photographs the first image and the second image by adjusting the exposure duration and the ISO of the camera.

In another implementation, the second image may be an image that is selected from images photographed by a plurality of cameras and whose color and brightness degree is the highest or whose color and brightness degree is higher than a threshold.

In another implementation, either of the first image and the second image may be obtained by fusing a plurality of frames of images, but is not directly photographed by the camera. The plurality of frames of images may be photographed by a same camera, or may be photographed by different cameras. A part of the plurality of frames of cameras is photographed by a same camera, and another part is photographed by different cameras. This is not limited in this embodiment of this application.

Example 1: The method further includes: capturing N frames of images for the first scenario by using the first camera, where N is an integer greater than or equal to 1; and performing multi-frame noise reduction based on the N frames of images and the first image to obtain a fourth image. In this case, the optimizing the first image based on the second image, to obtain a third image may include: optimizing the fourth image based on the second image, to obtain the third image. In other words, the terminal optimizes an image obtained by fusing a plurality of images photographed by a same camera, to obtain the third image.

Example 2: The method further includes: respectively capturing N1 frames of images and N2 frames of images for the first scenario by using the first camera and the second camera, where both N1 and N2 are integers greater than or equal to 1; and performing multi-frame noise reduction based on the N1 frames of images, the N2 frames of images, and the first image to obtain a fifth image. In this case, the optimizing the first image based on the second image, to obtain a third image may include: optimizing the fifth image based on the second image, to obtain the third image. In other words, the terminal optimizes an image obtained by fusing a plurality of images photographed by different cameras, to obtain the third image.

In an example, the foregoing example 1 and example 2 may be applicable to a case in which the zooming ratio of the terminal for the first scenario is within [1, 3) or [3, 7), or greater than 10. For details of selecting the first camera and the second camera in these cases, refer to the foregoing descriptions.

Example 3: The terminal further includes a third camera. A ratio of the third camera is not greater than the ratio of the first camera. The method further includes: respectively capturing N3 frames of images and N4 frames of images for the first scenario by using the first camera and the third camera, where both N3 and N4 are integers greater than or equal to 1; and performing multi-frame noise reduction based on the N3 frames of images, the N4 frames of images, and the first image to obtain a sixth image. In this case, the optimizing the first image based on the second image, to obtain a third image may include: optimizing the sixth image based on the second image, to obtain the third image. The third camera is a camera that is in the terminal and that is different from the first camera and the second camera. In other words, the terminal may optimize an image obtained by fusing a plurality of images photographed by at least three cameras, to obtain the third image.

In an example, the foregoing example 1 and example 2 may be applicable to a case in which the zooming ratio of the terminal for the first scenario is within [7, 10). For details of selecting the first camera and the second camera in this case, refer to the foregoing descriptions.

The technical solutions provided in the example 1 to the example 3 help improve the color and brightness degree of the third image obtained through optimization, to improve user experience.

There are more frame output and fusion methods. This is not limited in this embodiment of this application.

S103: The terminal determines whether the second image is available.

In a process of photographing the first scenario to obtain the second image, an abnormal case such as lens blocking, a dramatic environment change, an extremely severe hand shake, or severe blur may occur. As a result, the photographed second image cannot be used as a reference (or has low reference value), that is, the second image is unavailable. Therefore, in this embodiment of this application, before the chrominance of the first image is optimized, whether the second image is available may be first determined.

In an embodiment, S103 may include the following operations S103A and S103B.

S103A: The terminal performs preprocessing on the second image, so that viewfinder ranges of the first image and the processed second image are the same or similar (that is, a difference between the viewfinder ranges is within a preset range), and sizes (including a width and a height) of the first image and the processed second image are the same or similar (that is, a difference between the sizes is within a preset range). Details are as follows:

Step 1: When a photographing condition of the first image and a photographing condition of the second image meet a preset condition, the terminal performs processing such as zooming and cropping on the second image, so that the viewfinder range of the processed second image is close to the viewfinder range of the first image (that is, the difference between the viewfinder ranges is within the preset range).

The preset condition may include the following condition 1 or condition 2:

Condition 1: The first image is photographed under a zoom condition, and the second image is photographed under a non-zoom condition. Alternatively, the second image is photographed under a zoom condition, but a zoom ratio used for capturing the second image is different from a zoom ratio used for capturing the first image.

Condition 2: The first image is photographed under a non-zoom condition, and the second image is photographed under a zoom condition.

It should be noted that the operation 1 is optional. If the first image and the second image are both photographed under a non-zoom condition, or if the first image and the second image are both photographed under a zoom condition, but a zoom ratio used for capturing the first image and a zoom ratio used for capturing the second image are the same, the viewfinder ranges of the first image and the second image are generally similar (the same or similar). In this case, processing such as zooming and cropping may not be performed on the second image, but the following operation 2 is directly performed.

Step 2: The terminal may adjust the sizes of the first image and the second image whose viewfinder ranges are similar to each other to be the same (or similar). Refer to the conventional technology for more details.

It should be noted that the operation S103A is optional. If the viewfinder ranges of the photographed first image and the photographed second image are similar, and the sizes of the photographed first image and the photographed second image are the same or similar, the terminal may not perform S103A.

S103B: The terminal determines whether the first image and the processed second image can be effectively registered when a luminance histogram of the first image and a luminance histogram of the processed second image are corrected to be equivalent (that is, a difference between the two luminance histograms is within a preset range). If the first image and the processed second image can be effectively registered, it indicates that the second image is available; otherwise, it indicates that the second image is unavailable.

A method for measuring effective registration is not limited in this embodiment of this application. For example, the measurement method may include: searching for a feature pairing point pair for the first image and the processed second image by using a classic method such as sift or surf. If a quantity of feature pairing point pairs for the first image and the processed second image is less than or equal to a preset value, it is considered that the first image and the processed second image cannot be effectively registered: otherwise, it is considered that the first image and the processed second image can be effectively registered. Refer to the conventional technology for more details.

It should be noted that, in the technical solution provided in this embodiment of this application, the second image photographed in an abnormal case such as shake and blur has high robustness. In this case, a determining result of effective registration by using the classic method such as sift or surf is usually "unavailable". In this case, in a possible implementation, a binary AI network may be specially trained to determine effective registration. This method is more flexible and accurate than the classic method. A specific method for training the binary AI network, and the like are not limited in this embodiment of this application.

In addition, it should be noted that, if preprocessing does not need to be performed on the second image (that is, S103A is not performed), and S103B is directly performed, S103B is that the terminal determines whether the first image and the second image can be effectively registered when the luminance histograms of the first image and the second image are corrected to be equivalent.

S104: If the second image is available (that is, the first image and the second image are successfully registered), optimize the first image based on the second image, to obtain the third image. The color and brightness degree of the third image is higher than the color and brightness degree of the first image.

For a manner of determining the color and brightness degrees of the two images, refer to the foregoing description. Details are not described herein again.

Based on the foregoing explanation of the color and brightness degree of the second image and the color and brightness degree of the first image, and the situation that the third image and the first image meet a condition that the color and brightness degree of the third image is higher than the color and brightness degree of the first image, it may be obtained that:

The first image, the second image, and the third image meet at least one of the following conditions: If the color of the second image is better than the color of the first image, a color of the third image is better than the color of the first image. If the contrast of the second image is higher than the contrast of the first image, a contrast of the third image is higher than the contrast of the first image. If the dynamic range of the second image is larger than the dynamic range of the first image, a dynamic range of the third image is larger than the dynamic range of the first image.

In an embodiment, image content of the third image is the same as image content of the first image. This is equivalent to that texture information of the third image is the same as texture information of the first image. "Same" herein may refer to being the same within a specific error range.

In an embodiment, if some regions (marked as first-type regions) exist in the first image but do not exist in the second image due to an abnormal case such as shake and blur, that is, a region corresponding to the first-type region cannot be found in the second image, where a region and a region corresponding to the region are used to represent a same object, and some regions (marked as second-type regions) exist in the first image and also exist in the second image, that is: a region corresponding to the second-type region can be found in the second image, it may be considered that the second image is available. In this case, the second image being available means that the region that is in the second image and corresponds to the second-type region is available.

Therefore, the terminal may circle, in the first image by using a ghost detection method, a region (namely, the first-type region) whose corresponding region cannot be found in the second image. The ghost detection method is not limited in this embodiment of this application. Further, after performing S104 to obtain the third image, the terminal may perform no processing on a region (that is, a region that represents a same object as the first-type region) that is in the third image and that corresponds to the first-type region, and perform gradient fusion on the region and another region at a boundary; to remove an obvious boundary between the region and the another region and improve image quality.

In an embodiment, if the second image is available, before S104 is performed, the method may further include: The terminal performs registration on the first image and the second image (which may be the second image obtained through the foregoing preprocessing). A registration method may include but is not limited to classic sift, surf, and the like. Certainly, an AI network may also be used to perform registration. After a registration operation is performed, S104 is performed, which helps make an optimization result more accurate.

After S104 is performed.

In an embodiment, the terminal may display the third image obtained in S104.

In another embodiment, the following case may exist: only a pixel value range (or a region) is expected to be adjusted, and another location remains unchanged. Based on this, this embodiment of this application provides the following technical solutions:

First, the terminal obtains a first target sub-image in the first image. The first target sub-image is a region whose color and brightness information is not expected to be changed in the first image. The first target sub-image may be a highlight region or even an overexposure region in the first image, or a region including a specific color, or a region specified based on semantic content or the like, or may be obtained based on a network such as an attention network. Then, the terminal obtains a second target sub-image in the third image. The second target sub-image and the first target sub-image describe a same object. Then, the terminal updates (or replaces) the second target sub-image in the third image by using the first target sub-image, to obtain the fourth image. Alternatively, the terminal splices the first target sub-image and an image other than the second target sub-image in the third image, to obtain the fourth image. For example, final result=direct result * (1−mask)+first image * mask. The final result indicates the fourth image. The direct result indicates the third image. The mask indicates a location of the first target sub-image in the first image or a location of the second target sub-image in the third image. The first image * mask indicates the first target sub-image. The direct result * mask indicates the second target sub-image. Subsequently, the terminal may display the fourth image. A color and brightness degree of the fourth image is higher than the color and brightness degree of the first image, and image content of the fourth image is the same as (or similar to) the image content of the first image.

In an embodiment, the mask may also be a region circled in the second image, and efficiency is usually higher. To be specific, a region with poor effect in the second image is not expected to be used in the first image, for example, the highlight region or the overexposure region. In this case, Gaussian blur or feathering is/are performed on the circled mask to construct a gradient transition band. In this way, non-registration between the first image and the second image may be neglected when a fusion operation is applied to the first image, to ensure expected effect.

In an embodiment, the mask may also be solved by using a network, for example, an attention network.

In an embodiment, based on any one of the foregoing manners, input of the network may be the first image, the second image, or a combination of the first image and the second image. The following describes S104 in detail.

In an embodiment, that the terminal optimizes the first image based on the second image to obtain the third image may include the following manners.

Manner 1: A CCM matrix is used to represent a mapping relationship between the color and brightness information of the first image and the color and brightness information of the second image, to optimize the first image based on the CCM matrix, so as to obtain the third image.

Figure 6:
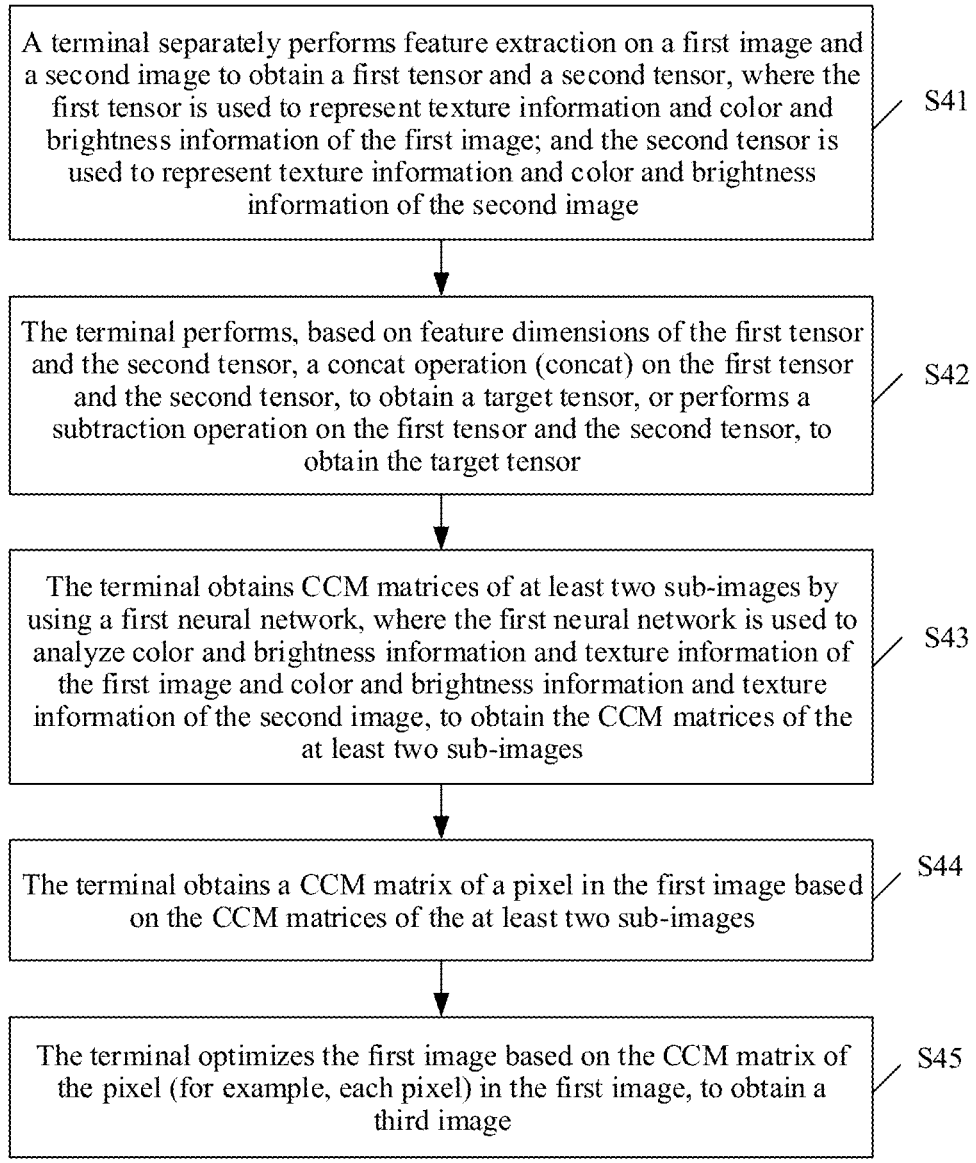
FIG. 6 is a flowchart of a method for optimizing a first image according to an embodiment of this application.

Specifically, as shown in FIG. 6, the manner 1 may include the following operations S41 to S45.

S41: The terminal separately performs feature extraction on the first image and the second image to obtain a first tensor and a second tensor. The first tensor is used to represent the texture information and the color and brightness information of the first image. The second tensor is used to represent the texture information and the color and brightness information of the second image. A size of the first tensor is the same as that of the second tensor.

For example, the terminal separately performs feature extraction on the first image and the second image by using an AI technology such as a neural network, to obtain the first tensor and the second tensor. For a method in which the terminal performs feature extraction on an image by using a neural network, refer to the conventional technology. Details are not described herein. The terminal may further separately perform feature extraction on the first image and the second image by using the conventional technology instead of an AI technology. This is not limited in this embodiment of this application.

In addition to performing S103A, when S104A is performed, the second image in S104A may be the preprocessed second image.

An example in which both the first image and the second image are color images is used. Before performing feature extraction on the first image and the second image by using a third neural network, the terminal may perform the following operations: First, adjust (resize) sizes of the first image and the second image to be the same, for example, resize the second image, so that the first image and the resized second image have a same size. If the first image and the second image have the same size after S102 is performed, this operation may not be performed. Then, input the adjusted first image and the adjusted second image into the third neural network. The sizes of the adjusted first image and the adjusted second image are marked as H*W*3. H and W respectively indicate a width and a height of the adjusted first image and the adjusted second image. 3 represents three RGB channels. For example, values of H and W may be predefined in the third neural network.

In an example, the third neural network may finally divide the first image and the second image into h*w image blocks respectively. h and w respectively indicate quantities of image blocks obtained by dividing the first image (or the second image) in a width direction and a height direction. For example, values of h and w may be predefined in the third neural network.

In an embodiment, if a convolution kernel for a convolution operation used in the third neural network is a square convolution kernel, H/h=W/w=D needs to be satisfied. D is a positive integer. In this case, a size of each image block is D*D.

In an embodiment, it is assumed that the sizes of the first tensor and the second tensor are marked as $h_f*w_f*c_f$, $H/h_f=W/w_f=D1$ is satisfied. D1 is a positive integer. $c_f$ is a quantity of features. For example, if 10 texture features and 10 color features are extracted, $c_f$ is 20. For example, values of $h_f$, $w_f$, and $c_f$ may be predefined in the third neural network.

In an embodiment, the terminal may use a same third neural network, or may use different third neural networks to perform the feature extraction on the first image and the feature extraction on the second image.

S42: The terminal performs, based on feature dimensions of the first tensor and the second tensor, a concat operation (concat) on the first tensor and the second tensor, to obtain a target tensor, or performs a subtraction operation on the first tensor and the second tensor, to obtain a target tensor.

An example in which the sizes of the first tensor and the second tensor are marked as $h_f*w_f*c_f$ is used. A size of the target tensor that is obtained by performing, based on the feature dimensions of the first tensor and the second tensor, the concat operation on the first tensor and the second tensor is $h_f*w_f*2c_f$.

A tensor obtained by subtracting two tensors is a tensor formed by an element obtained by subtracting elements that are in the two tensions and are at a same location. An example in which the sizes of the first tensor and the second tensor are marked as $h_f*w_f*c_f$ is used. A size of the target tensor obtained by performing the subtraction operation on the first tensor and the second tensor is $h_f*w_f*c_f$. "A−B" is equivalent to "A+(−B)". Therefore, performing the subtraction operation on the first tensor and the second tensor is equivalent to performing an addition operation on the first tensor and an opposite number of the second tensor.

S43: The terminal obtains CCM matrices of at least two sub-images by using a first neural network. The first neural network is used to analyze the color and brightness information and the texture information of the first image and the color and brightness information and the texture information of the second image, to obtain the CCM matrices of the at least two sub-images, for example, a CCM matrix of each sub-image obtained by dividing the first image.

In an embodiment, input information of the first neural network includes the target tensor. Output information of the first neural network includes the CCM matrix of each sub-image in the first image.

The at least two sub-images include a first sub-image. A CCM matrix of the first sub-image is used to represent a mapping relationship between a color of the first sub-image and a color of a second sub-image in the second image. The first sub-image and the second sub-image are images of a same object. The first sub-image may be any one of at least two sub-images included in the first image. The "object" refers to a same portion/part of the same object. For example, the object may be an eye, a nose, a mouth, or the like of a person. For another example, the object may be a left index finger part of a person or a right little finger part of a person.

In an embodiment, the sub-image meets one of the following conditions.

Condition 1: The sub-image is an image block in the first image. Different image blocks have a same size.

One frame of image may include at least two image blocks. The image block is a rectangle, for example, may be a square. Based on the condition 1, one sub-image may be considered as an image block in one frame of image.

Condition 2: The sub-image is determined based on a similarity between pixels in the first image. A similarity between pixels in a same sub-image is greater than or equal to a third threshold. In an embodiment, different similarities in the different sub-images are less than the third threshold.

This technical solution is provided in consideration of that "generally, in a same image, similarities between pixels that describe a same object do not greatly differ, but similarities between pixels that describe different objects greatly differ". For example, it is assumed that the first image includes a person and a building, there may be a large difference between similarities between pixels that describe the person and pixels that describe the building, but there is a small difference between the similarities between the pixels that describe the building. In this case, the pixels that describe the person may be collectively used as one sub-image, and the pixels that describe the building may be collectively used as one sub-image. For another example, for pixels that describe a person, similarities between pixels that describe a coat of a person and pixels that describe hair of the person may be quite different. In this case, the pixels that describe the coat of the person may be collectively used as one sub-image, and the pixels that describe the hair of the person may be collectively used as one sub-image.

It may be understood that, for different sub-images, values of the third threshold may be the same or different.

To be distinguished from a pixel block, in some descriptions in this embodiment of this application, each sub-image obtained by dividing an image based on a similarity is referred to as a pixel group. One frame of image may include one or more pixel groups. Based on the condition 2, one sub-image may be considered as a pixel group in one frame of image.

Condition 3: The sub-image is determined based on a similarity between pixels in the image block in the first image. Different image blocks have a same size. The similarity between the pixels in a same sub-image of a same image block is greater than the third threshold.

Based on the condition 3, one sub-image may be considered as a pixel group in one image block in one frame of image.

Compared with the foregoing condition 1 or condition 2, the condition 3 is to divide one frame of image at a finer granularity. In this way, more CCM matrices are obtained by performing S43, so that an interpolation result obtained by performing S44 is more accurate.

Based on the condition 3, a size of an output result of the first neural network may be $h*w*(n_g*n_m)$. A process in which the first neural network processes the first image and the second image may be equivalent to: evenly dividing the first image frame into $h*w$ pixel blocks, and dividing pixels in each pixel block into $n_g$ pixel groups based on the similarity. For each pixel group, the first neural network outputs $n_m$ CCM matrix elements. For example, $n_m$ is usually set to 9, and corresponds to a quantity of elements of a conventional 3*3 CCM matrix, that is, a y channel, a u channel, and a v channel are all processed. For example, if it is expected that only chrominance is processed in this solution, that is, only the u channel and the y channel are processed, $n_m$ may be a value less than 9, for example, 6. This is equivalent to that three elements for processing the y channel may be ignored. Certainly, in this case, the output CCM matrix is applicable to a YUV domain.

The foregoing S43 may be considered as an implementation of obtaining the CCM matrices of the at least two sub-images. Embodiments of the present invention are not limited thereto. For example, the CCM matrices of the at least two sub-images may be obtained by using a conventional method instead of the AI technology.

S44: The terminal obtains a CCM matrix of the pixel in the first image based on the CCM matrices of the at least two sub-images. For example, the terminal performs an interpolation operation based on the CCM matrices of the at least two sub-images, to obtain a CCM matrix of each pixel in the first image. The first image includes a first pixel. The first pixel may be any pixel in the first image. The CCM matrix of the first pixel is used to represent a mapping relationship between a color of the first pixel and a color of a second pixel in the second image. The first pixel and the second pixel correspond to same image content.

Figure 7:
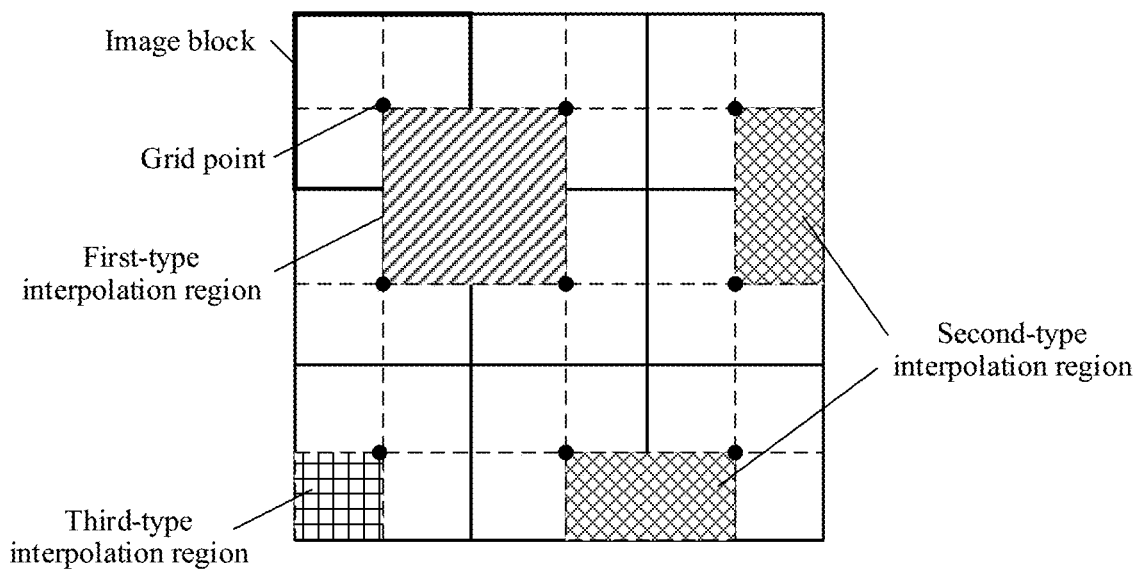
FIG. 7 is a schematic diagram of evenly dividing a first image by using a grid according to an embodiment of this application.

FIG. 7 is a schematic diagram of evenly dividing the first image by using a grid. It is assumed that netout[i, j, 0:$n_g*n_m$] output by the first neural network is a $(i,j)^{th}$ CCM matrix that is of the first image and that corresponds to a region center point (that is, a grid point), where 0≤i<h and 0≤j<w: In this case, the CCM matrix of each pixel in the first image may be obtained by performing interpolation based on a grid point adjacent to the pixel. A square region is circled by using each pixel as a center. An area of the square region may be equal to a size of each square region obtained by evenly dividing the first image. All grid points in the square region are used for interpolation to obtain a CCM matrix of the pixel. According to this rule, as shown in FIG. 7, it is not difficult to see that there are three types of interpolation regions (for example, a first-type interpolation region, a second-type interpolation region, and a third-type interpolation region), which are divided based on a quantity of grid points required for interpolation.

A feature of a pixel of the first image is denoted as s, and there are M grid points for interpolation of the pixel. In this case, for an $m^{th}$ grid point, 0≤m<M, and data participating in interpolation includes netout [$i_m$, $j_m$, $n_{ms}*n_m$:($n_{ms}$+1)*$n_m$] and netout [$i_m$, $j_m$, ($n_{ms}$+1)*$n_m$: ($n_{ms}$+2)*$n_m$]. For the $m^{th}$ grid point, the similarity s of the pixel is between an $(n_{ms})^{th}$ group and an $(n_{ms}+1)^{th}$ group, and 0≤$n_{ms}$≤$n_g$−1. Herein, it may be understood that the pixel may be added to the two groups. A simplest way to measure a similarity is to use a value of a y channel of a pixel. Grouping is to evenly divide a value range [0, 255] of the y channel into $n_g$ groups. In this case, an integer part of $(n_g-1) * s/255$ is $n_{ms}$. Certainly, there are other methods for calculating the similarity; y; u, and v may be comprehensively considered, correlation may be calculated, or even a network may be specially trained for calculation. More broadly, similarity measurement methods for a pixel for each interpolation grid point may be different, provided that interpolation continuity can be ensured. To ensure continuity, for a single grid point, all pixels of the first image in a square region whose side length is 2D and that uses the grid point as a center are measured by using a same similarity measurement method relative to the grid point.

The interpolation method may be a linear method, a cubic method, a lancoz method, or the like. The linear method is used as an example. For an $m^{th}$ grid point, a distance between the similarity s of the pixel and an $(n_{ms})^{th}$ group and a distance between the similarity s of the pixel and an $(n_{ms}+1)^{th}$ group are respectively $L_{ms}$ and $L_{ms}+1$. Then, Am=netout $[i_m, j_m, n_{ms}*n_m:(n_{ms}+1)*n_m]*L_{ms}+1/(L_{ms}+L_{ms}+1)$+netout $[i_m, j_m, (n_{ms}+1)*n_m:(n_{ms}+2)*n_m]*L_{ms}/(L_{ms}+L_{ms}+1)$. If coordinates of the pixel and the M interpolation grid points are known, each Am is used to perform bilinear interpolation, to obtain the CCM matrix of the pixel.

A grid division method is used, and the network outputs a local CCM matrix. Actually, the network may synchronously output a global CCM matrix. For each pixel, the local CCM matrix and the global CCM matrix are combined to obtain a final CCM matrix. A combination method may be linear addition in proportion.

In an embodiment, after obtaining the CCM matrix of each pixel, the terminal may perform recheck, review; and correction by using a related hardware parameter during photographing. The CCM matrix is further optimized, or in case that the calculated CCM matrix is extremely abnormal (for example, the first image or the second image is abnormal, or calculation is incorrect), the solution is terminated. In particular, an additional sensor may be used to record environment information for verification (which may be used to deduce whether the photographed first image or second image is normal).

S45: The terminal optimizes the first image based on the CCM matrix of the pixel (for example, each pixel) in the first image, to obtain the third image. Specifically, for any pixel (marked as a target pixel) in the first image, the terminal multiplies a pixel value of the target pixel by a CCM matrix of the target pixel, to obtain a pixel value of a pixel in the third image. The third pixel and the target pixel in the first pixel correspond to same image content.

In the manner 1, a CCM matrix method is used to optimize the first image, which helps ensure that texture information and definition of the processed first image remain unchanged (or basically remain unchanged). In addition, in S43 and S44, the CCM matrix of each sub-image is first obtained by using the neural network, and then the CCM matrix of each pixel is obtained through interpolation by using a conventional method. In this way, compared with a technical solution of "directly obtaining the CCM matrix of each pixel directly based on the neural network" in the conventional technology, this helps reduce calculation complexity, to shorten calculation time, and effectively control performance overheads.

Figure 8A:
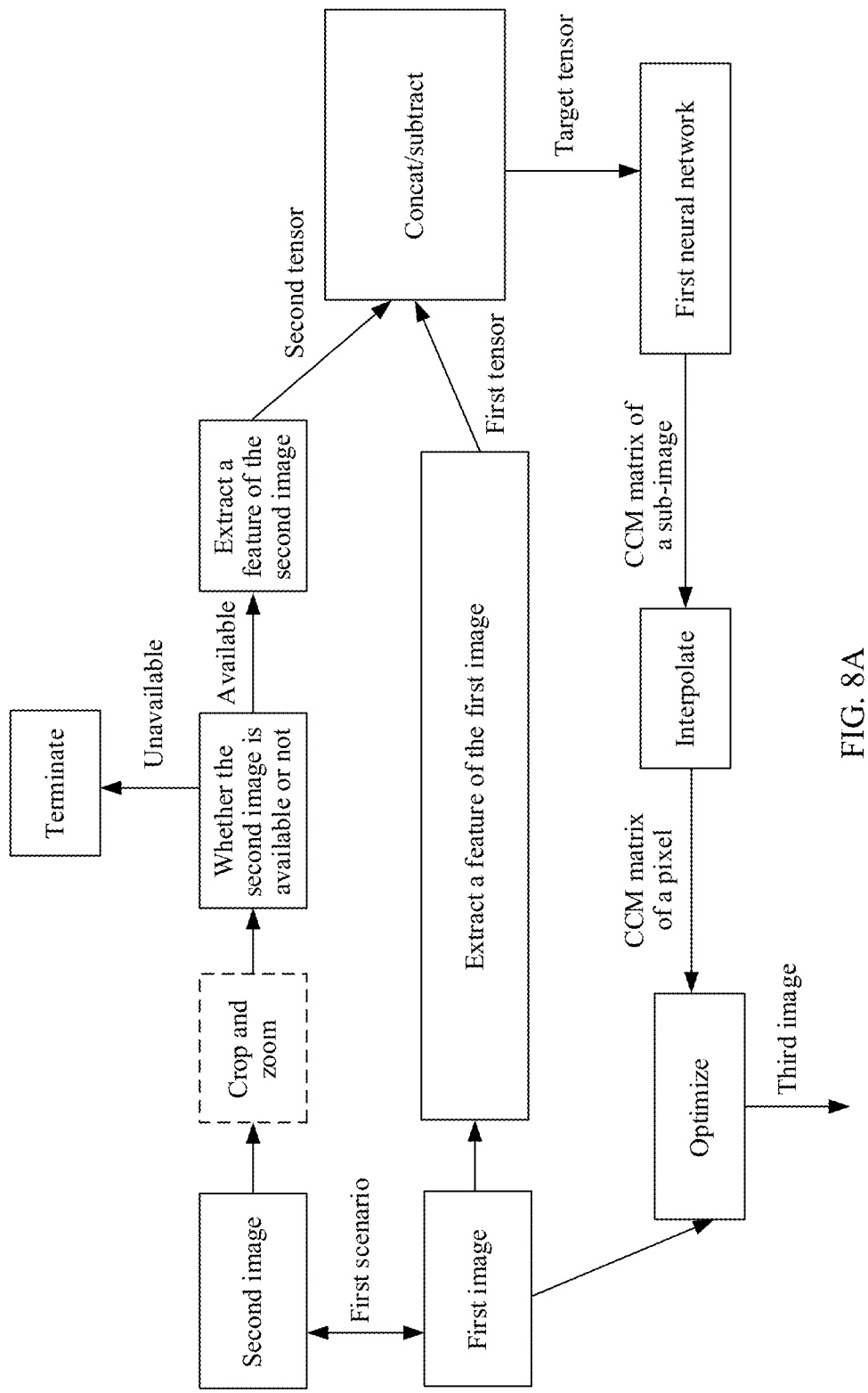
FIG. 8A is a schematic diagram of a process of optimizing a first image based on a CCM matrix according to an embodiment of this application.

FIG. 8A is a schematic diagram of a process of optimizing the first image based on the CCM matrix. Refer to the foregoing description for more details.

FIG. 8B is a schematic diagram of comparison between the first image, the second image, and the third image when the first image is optimized based on the CCM matrix. It can be seen from FIG. 8B that, in the technical solution, the color and brightness information in the second image may be "migrated" (which is not limited thereto) to a corresponding location in the first image. In addition, it can be seen by comparing the third image with the first image that texture information and definition of the third image are basically consistent with those of the first image, that is, original texture information and definition of the first image remain basically unchanged before and after optimization. In addition, it can be seen by comparing the third image with the first image that both brightness and saturation of a green plant in the third image are better than those in the first image, and luminance of the ground and a stone fence in the third image is also better than that in the first image, that is, an original color and brightness degree of the first image is improved before and after optimization.

The following provides descriptions by using an example in which "CCM matrices of a plurality of sub-images included in the first image are first obtained, and then interpolation is performed based on the CCM matrices of the plurality of sub-images, to obtain a CCM of each pixel in the first image". In an embodiment, the first image may not be divided into sub-images, that is, a CCM matrix of the first image is obtained by using an image as a granularity, and the CCM matrix of the first image is used as the CCM matrix of each pixel in the first image. This helps reduce calculation complexity, and reduce calculation performance overheads.

Manner 2: The third image is directly output by using a neural network, that is, a pixel of each image in the third image is directly output. As shown in FIG. 9, the method may include the following operations S51 to S53.

S51 and S52: Refer to S41 and S42.

S53: The terminal optimizes the first image by using a second neural network and the second image, to obtain the third image. The second neural network is used to perform image style optimization on an image with a poor image style by using an image with a good image style.

In an embodiment, input information of the second neural network includes a target tensor. The target tensor is used to represent texture information and color and brightness information of the first image and texture information and color and brightness information of the second image. Output information of the second neural network includes the third image.

In an embodiment, the second neural network may be a Unet-type AI network.

Figure 10:
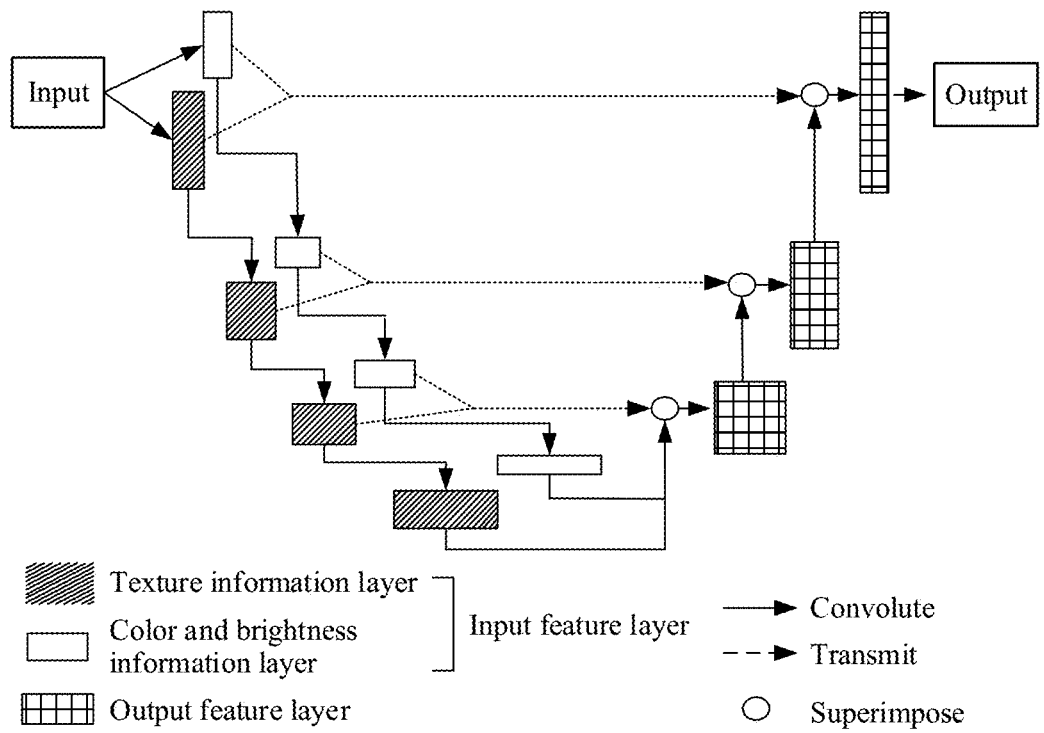
FIG. 10 is a schematic diagram of a network structure and logical functions of a neural network according to an embodiment of this application.

In an embodiment, FIG. 10 is a schematic diagram of a structure and logic of the second neural network according to an embodiment of this application.

An encoding and decoding idea may be applied to the second neural network. A left side of the network is considered as an encoding layer for the first image, and a right side of the network is considered as a decoding layer for the first image. The encoding layer part includes a texture information layer and a color and brightness information layer. The texture information layer is used to encode the texture information of the first image. The color and brightness information layer is used to encode the color and brightness information of the first image. A requirement for the encoding layer includes: When network input is a tensor obtained by performing concat on texture information and color and brightness information of two frames of same first images, the color and brightness information layer accurately records original color and brightness information of the first image, so that network output is strictly equal to the first image itself. When network input is a tensor obtained by performing concat on the texture information and the color and brightness information of the first image and the texture information and the color and brightness information of the second image, the network learns the color and brightness information of the second image, to guide the color and brightness information layer of the first image to change, but the texture information layer is not affected (or is affected within a small range), so that final network output is an expected result figure (that is, the third image) obtained by optimizing the color and brightness information of the first image.

Specifically, as shown in FIG. 10, the second neural network separately performs a convolution operation on a first sub-tensor and a second sub-tensor in the target tensor. The first sub-tensor includes texture information in the target tensor. The second sub-tensor includes a color in the target tensor. The convolution operation may be performed for a plurality of times. Then, a tensor obtained by performing the convolution operation based on the first sub-tensor and a tensor obtained by performing the convolution operation based on the second sub-tensor are superimposed, to obtain a superimposed tensor. Finally, the superimposed tensor, the first sub-tensor, and the second sub-tensor are superimposed, to obtain the third image.

An actual benefit of designing the network in this way includes: When the network processes the color and brightness information of the first image, the texture information of the first image is not changed (or the texture information of the first image is slightly changed). In addition, the network decouples the texture information and the color and brightness information from a structure. In this way, on one hand, this makes network processing more targeted and more accurate, artifacts are not easily introduced, and it is ensured that the texture information and definition are not affected when the color and brightness information is changed. On the other hand, this helps reduce performance overheads of network processing. For example, it is assumed that depths of the texture information layer before and after convolution processing are d1in and d1out, depths of the color and brightness information layer before and after convolution processing are d2in and d2out, and total depths before and after convolution processing before decoupling are d1in+d2in and d1out+d2out. In this case, provided that sizes of convolution kernels are equivalent, performance overheads of a convolution operation before decoupling are generally much higher than performance overheads of using two convolution operations to respectively process the texture information layer and the color and brightness information layer after decoupling.

In this manner 2, feature information (including texture information and color and brightness information) of an image is input into the second neural network by using the image as a granularity to perform an optimization operation. During actual implementation, alternatively, feature information (including texture information and color and brightness information) that is in the first image and the second image and that represents a same corresponding image block may be input into the second neural network by using a sub-image (for example, an image block) as a granularity to perform an optimization operation. Then, optimization results of corresponding sub-images in the first image and the second image are spliced to obtain the third image. Transition fusion may need to be performed during splicing. Refer to the conventional technology for more details.

In addition to the foregoing manner 1 and manner 2, S104 may be further implemented by using a conventional method, for example, a method for solving an optimization equation, or a method for matching the color and brightness information of the first image and the color and brightness information of the second image.

Figure 11:
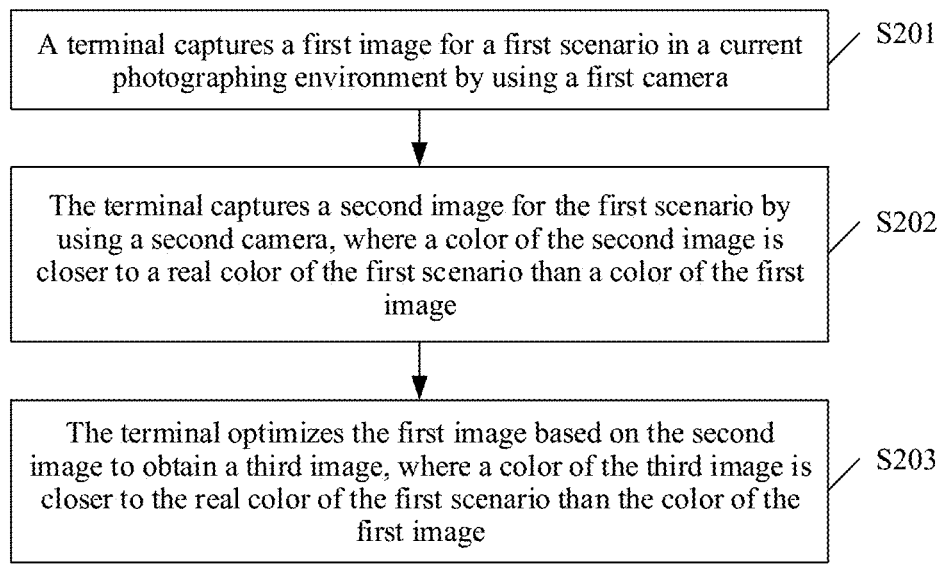
FIG. 11 is a schematic diagram of another image processing method according to an embodiment of this application.

FIG. 11 is a schematic diagram of an image processing method according to an embodiment of this application. The method is applied to a terminal. The terminal includes a first camera and a second camera. A ratio of the first camera is not less than a ratio of the second camera. The method may include the following operations.

S201: The terminal captures a first image for a first scenario in a current photographing environment by using the first camera. In an embodiment, when a light sensitivity ISO of the first camera in the current photographing environment is greater than a first threshold, the first camera captures the first image for the first scenario in the current photographing environment.

S202: The terminal captures a second image for the first scenario by using the second camera. A color of the second image is closer to a real color of the first scenario than a color of the first image.

In an embodiment, the second image and the first image meet at least one of the following conditions: Chrominance of the second image is closer to real chrominance of the first scenario than chrominance of the first image; and luminance of the second image is closer to real luminance of the first scenario than luminance of the first image.

S203: The terminal optimizes the first image based on the second image to obtain a third image. A color of the third image is closer to the real color of the first scenario than the color of the first image.

In an embodiment, image content of the third image is the same as image content of the first image.

This embodiment is particularly applicable to a scenario in which a color of a photographed image greatly differs from a color of a real scenario, that is, a color cast phenomenon occurs. For the conditions met by the first camera and the second camera, how to select the first camera and the second camera, how to use the second image to optimize the first image (or optimize the first image obtained through fusion), and the like in this embodiment, refer to the foregoing description. In principle, when there is no conflict, refer to the foregoing description for more details.

It may be understood that, to implement functions in the foregoing embodiment, the terminal includes corresponding hardware structures and/or software modules for performing the functions. A person of ordinary skill in the art should easily be aware that, in combination with the units and the method operations in the examples described in embodiments disclosed in this application, this application can be implemented by hardware or a combination of hardware and computer software. Whether a function is performed by hardware or hardware driven by computer software depends on particular application scenarios and design constraints of the technical solutions.

Figure 12:
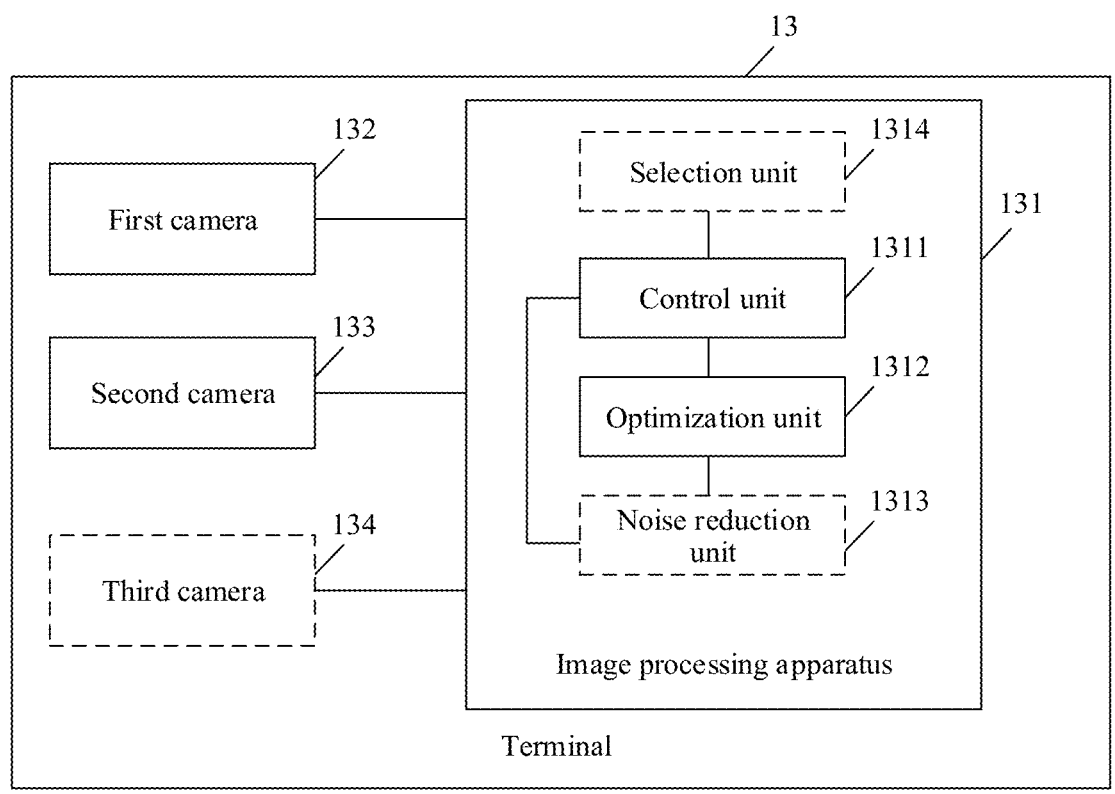
FIG. 12 is a schematic diagram of a structure of a terminal according to an embodiment of this application.

FIG. 12 is a schematic diagram of a structure of a possible image processing apparatus according to an embodiment of this application. The image processing apparatus may be configured to implement functions of a terminal in the foregoing method embodiments, and therefore can also implement beneficial effect of the foregoing method embodiments. In this embodiment of this application, the image processing apparatus may be the terminal 100 shown in FIG. 1, or may be a module (for example, a chip) used in the terminal. The following uses an example in which an image processing apparatus 131 is the module (for example, the chip) in the terminal for description.

As shown in FIG. 12, the terminal 13 includes the image processing apparatus 131, a first camera 132, and a second camera 133. A ratio of the first camera 132 is not less than a ratio of the second camera 133. The image processing apparatus 131 may include a control unit 1311 and an optimization unit 1312.

In some embodiments, the control unit 1311 is configured to: when an ISO of the first camera 132 in a current photographing environment is greater than a first threshold, control the first camera 132 to capture a first image for a first scenario in the current photographing environment, and control the second camera 133 to capture a second image for the first scenario. The optimization unit 1312 is configured to optimize the first image based on the second image, to obtain a third image. For example, with reference to FIG. 3, the control unit 1311 may be configured to perform S102, and the optimization unit 1312 may be configured to perform S104. When a color of the second image is better than a color of the first image, a color of the third image is better than the color of the first image. Alternatively, when a contrast of the second image is higher than a contrast of the first image, a contrast of the third image is higher than the contrast of the first image. Alternatively, when a dynamic range of the second image is larger than a dynamic range of the first image, a dynamic range of the third image is larger than the dynamic range of the first image.

Optimally, the color of the second image being better than the color of the first image includes at least one of the following conditions: Chrominance of the second image is greater than chrominance of the first image; and luminance of the second image is greater than luminance of the first image.

In some other embodiments, the control unit 1311 is configured to: when a light sensitivity ISO of the first camera 132 in a current photographing environment is greater than a first threshold, control the first camera 132 to capture a first image for a first scenario in the current photographing environment, and control the second camera 133 to capture a second image for the first scenario. A color of the second image is closer to a real color of the first scenario than a color of the first image. The optimization unit 1312 is configured to optimize the first image based on the second image to obtain a third image. A color of the third image is closer to the real color of the first scenario than the color of the first image. For example, with reference to FIG. 11, the control unit 1311 may be configured to perform S201 and S202, and the optimization unit 1312 may be configured to perform S203.

In an embodiment, the second image and the first image meet at least one of the following conditions: Chrominance of the second image is closer to real chrominance of the first scenario than chrominance of the first image; and luminance of the second image is closer to real luminance of the first scenario than luminance of the first image.

Based on any one of the foregoing embodiments, the following optional implementations are provided:

In an embodiment, image content of the third image is the same as image content of the first image.

In an embodiment, photosensitive performance of the second camera 133 is higher than photosensitive performance of the first camera 132.

In an embodiment, an aperture of the second camera 133 is greater than an aperture of the first camera 132.

In an embodiment, exposure duration when the second camera 133 captures the second image is greater than exposure duration when the first camera 132 captures the first image.

In an embodiment, an ISO used when the second camera 133 captures the second image is greater than an ISO used when the first camera 132 captures the first image.

In an embodiment, a ratio range of the second camera 133 is [0.5, 1), and a ratio range of the first camera 132 is [1, 20].

In an embodiment, a ratio of the second camera 133 is 1, and a ratio range of the first camera 132 is (1, 20].

As shown in FIG. 12, in an embodiment, the image processing apparatus 131 further includes a noise reduction unit 1313.

In an embodiment, the control unit 1311 is further configured to control the first camera 132 to capture N frames of images for the first scenario. N is an integer greater than or equal to 1. The noise reduction unit 1313 is configured to perform multi-frame noise reduction based on the N frames of images and the first image to obtain a fourth image. The optimization unit 1312 is configured to optimize the fourth image based on the second image to obtain the third image. Image content of the fourth image is the same as the image content of the first image.

In an embodiment, the control unit 1311 is further configured to control the first camera 132 and the second camera 133 to respectively capture N1 frames of images and N2 frames of images for the first scenario. Both N1 and N2 are integers greater than or equal to 1. The noise reduction unit 1313 is configured to perform multi-frame noise reduction based on the N1 frames of images, the N2 frames of images, and the first image to obtain a fifth image. The optimization unit 1312 is configured to optimize the fifth image based on the second image to obtain the third image. Image content of the fifth image is the same as the image content of the first image.

In an embodiment, the terminal 13 further includes a third camera 134. A ratio of the third camera 134 is less than the ratio of the first camera 132. The control unit 1311 is further configured to control the first camera 132 and the third camera 134 to respectively capture N3 frames of images and N4 frames of images for the first scenario. Both N3 and N4 are integers greater than or equal to 1. The noise reduction unit 1313 is configured to perform multi-frame noise reduction based on the N3 frames of images, the N4 frames of images, and the first image to obtain a sixth image. The optimization unit 1312 is configured to optimize the sixth image based on the second image to obtain the third image. Image content of the sixth image is the same as the image content of the first image.

As shown in FIG. 12, in an embodiment, the image processing apparatus 131 further includes:

In an embodiment, the selection unit 1314 is configured to:

When a zooming ratio of the terminal 13 for the first scenario is within [1, 3), select a camera whose ratio is 1 in the terminal 13 as the first camera 132;

when a zooming ratio of the terminal 13 for the first scenario is within [3, 7), select a camera whose ratio is 3 in the terminal 13 as the first camera 132;

when a zooming ratio of the terminal 13 for the first scenario is greater than 10, select a camera whose ratio is 10 in the terminal 13 as the first camera 132; or when a zooming ratio of the terminal 13 for the first scenario is within [7, 10), select a camera whose ratio is 10 in the terminal 13 as the first camera, and select a camera whose ratio is 3 in the terminal as the first camera 132.

In an embodiment, the selection unit 1314 is further configured to:

when a zooming ratio of the terminal 13 for the first scenario is within [1, 3), select a camera whose ratio is 1 or less than 1 in the terminal 13 as the second camera 133;

when a zooming ratio of the terminal 13 for the first scenario is within [3, 7), select a camera whose ratio is 3, 1, or less than 1 in the terminal 13 as the second camera 133;

when a zooming ratio of the terminal 13 for the first scenario is [7, 10), select a camera whose ratio is 3, 1, or less than 1 in the terminal 13 as the second camera 133; or when a zooming ratio of the terminal 13 for the first scenario is greater than 10, select a camera whose ratio is 10, 3, 1, or less than 1 in the terminal 13 as the second camera 133.

In an embodiment, the optimization unit 1312 is configured to: obtain color correction matrices CCMs of at least two sub-images in the first image, where the at least two sub-images include a first sub-image, a CCM matrix of the first sub-image is used to represent a mapping relationship between a feature of the first sub-image and a feature of a second sub-image in the second image, the first sub-image and the second sub-image are images of a same object, and the feature includes at least one of a color, a contrast, or a dynamic range: obtain a CCM matrix of a pixel in the first image based on the CCM matrices of the at least two sub-images, where the first image includes a first pixel, a CCM matrix of the first pixel is used to represent a mapping relationship between a feature of the first pixel and a feature of a second pixel in the second image, and the first pixel and the second pixel correspond to same image content; and obtain the third image based on the first image and the CCM matrix of the pixel in the first image. For example, with reference to FIG. 6, the optimization unit 1312 may be configured to perform S43 to S45.

In an embodiment, when obtaining the CCM matrices of the at least two sub-images in the first image, the optimization unit 1312 is configured to obtain the CCM matrices of the at least two sub-images by using a first neural network. The first neural network is used to analyze a feature and texture information of the first image and a feature and texture information of the second image, to obtain the CCM matrices of the at least two sub-images.

In an embodiment, the optimization unit 1312 is configured to optimize the first image by using the second neural network and the second image, to obtain the third image, where the second neural network is used to perform image style optimization on an image with a poor image style by using an image with a good image style.

For specific descriptions of the foregoing optional manners, refer to the foregoing method embodiments. Details are not described herein again. In addition, for any explanation of the image processing apparatus 131 provided above and descriptions of beneficial effect, refer to the foregoing corresponding method embodiments. Details are not described herein again.

In an example, with reference to FIG. 1, a function of any one of the control unit 1311, the optimization unit 1312, the noise reduction unit 1313, and the selection unit 1314 may be implemented by the processor 110 by invoking the program code stored in the stored internal memory 121.

Another embodiment of this application further provides a computer-readable storage medium. The computer-readable storage medium stores instructions. When the instructions are run a terminal, the operations performed by the terminal in the method procedure shown in the foregoing method embodiments are performed.

In some embodiments, the disclosed method may be implemented as computer program instructions encoded in a machine-readable format on a computer-readable storage medium or encoded on another non-transitory medium or product.

It should be understood that the arrangement described herein is merely used as an example. Therefore, a person skilled in the art understands that another arrangement and another element (for example, a machine, an interface, a function, a sequence, and a functional group) can be used to replace the arrangement, and some elements may be omitted together depending on an expected result. In addition, many of the described elements are functional entities that can be implemented as discrete or distributed components, or implemented in any suitable combination at any suitable location in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely various embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method, comprising:
   when a light sensitivity (ISO) of a first camera of a terminal in a current photographing environment is greater than a first threshold, capturing a first image for a first scenario in the current photographing environment by using the first camera;
   capturing a second image for the first scenario by using a second camera of the terminal, wherein a ratio of the first camera is not less than a ratio of the second camera; and
   optimizing the first image based on the second image to obtain a third image, wherein
   when a color of the second image is better than a color of the first image, a color of the third image is better than the color of the first image;
   when a contrast of the second image is higher than a contrast of the first image, a contrast of the third image is higher than the contrast of the first image; or
   when a dynamic range of the second image is larger than a dynamic range of the first image, a dynamic range of the third image is larger than the dynamic range of the first image;
   wherein the optimizing the first image based on the second image to obtain the third image comprises:

optimizing the first image by using a second neural network and the second image to obtain the third image, wherein the second neural network is used to perform image style optimization on an image with a poor image style by using an image with a good image style.

2. The method according to claim 1, wherein the color of the second image being better than the color of the first image comprises at least one of the following conditions:
chrominance of the second image is greater than chrominance of the first image; or
luminance of the second image is greater than luminance of the first image.

3. The method according to claim 1, wherein image content of the third image is the same as image content of the first image.

4. The method according to claim 1, wherein photosensitive performance of the second camera is higher than photosensitive performance of the first camera.

5. The method according to claim 1, wherein an aperture of the second camera is greater than an aperture of the first camera.

6. The method according to claim 1, wherein an exposure duration when the second camera captures the second image is greater than an exposure duration when the first camera captures the first image.

7. The method according to claim 1, wherein an ISO used by the second camera to capture the second image is greater than an ISO used by the first camera to capture the first image.

8. The method according to claim 1, wherein
a ratio range of the second camera is [0.5, 1), and a ratio range of the first camera is [1, 20]; or
the ratio of the second camera is 1, and a ratio range of the first camera is (1, 20].

9. The method according to claim 1, wherein the method further comprises:
capturing N frames of images for the first scenario by using the first camera, wherein N is an integer greater than or equal to 1; and
performing multi-frame noise reduction based on the N frames of images and the first image to obtain a fourth image, wherein image content of the fourth image is the same as the image content of the first image; and
wherein the optimizing the first image based on the second image to obtain the third image comprises:
optimizing the fourth image based on the second image to obtain the third image.

10. An image processing apparatus, comprising:
a control unit, configured to: when a light sensitivity (ISO) of a first camera of a terminal in a current photographing environment is greater than a first threshold, control the first camera to capture a first image for a first scenario in the current photographing environment, and control a second camera of the terminal to capture a second image for the first scenario, wherein a ratio of the first camera is not less than a ratio of the second camera; and
an optimization unit, configured to optimize the first image based on the second image to obtain a third image, wherein
when a color of the second image is better than a color of the first image, a color of the third image is better than the color of the first image;
when a contrast of the second image is higher than a contrast of the first image, a contrast of the third image is higher than the contrast of the first image; or
when a dynamic range of the second image is larger than a dynamic range of the first image, a dynamic range of the third image is larger than the dynamic range of the first image;
wherein the optimizing the first image based on the second image to obtain the third image comprises:
optimizing the first image by using a second neural network and the second image to obtain the third image, wherein the second neural network is used to perform image style optimization on an image with a poor image style by using an image with a good image style.

11. The apparatus according to claim 10, wherein the color of the second image being better than the color of the first image comprises at least one of the following conditions:
chrominance of the second image is greater than chrominance of the first image; or
luminance of the second image is greater than luminance of the first image.

12. The apparatus according to claim 10, wherein image content of the third image is the same as image content of the first image.

13. The apparatus according to claim 10, wherein photosensitive performance of the second camera is higher than photosensitive performance of the first camera.

14. The apparatus according to claim 10, wherein an aperture of the second camera is greater than an aperture of the first camera.

15. The apparatus according to claim 10, wherein an exposure duration when the second camera captures the second image is greater than an exposure duration when the first camera captures the first image.

16. The apparatus according to claim 10, wherein an ISO used by the second camera to capture the second image is greater than an ISO used by the first camera to capture the first image.

17. The apparatus according to claim 10, wherein
a ratio range of the second camera is [0.5, 1), and a ratio range of the first camera is [1, 20]; or
the ratio of the second camera is 1, and a ratio range of the first camera is (1, 20].

18. The apparatus according to claim 10, wherein
the control unit is further configured to control the first camera to capture N frames of images for the first scenario, wherein N is an integer greater than or equal to 1;
the apparatus further comprises a noise reduction unit, configured to perform multi-frame noise reduction based on the N frames of images and the first image to obtain a fourth image, wherein image content of the fourth image is the same as the image content of the first image; and
the optimization unit is configured to optimize the fourth image based on the second image to obtain the third image.

19. A terminal, comprising:
a processor;
a memory; and
at least two cameras configured to photograph an image;
wherein the memory is configured to store instructions, and the processor is configured to execute the instructions to perform operations, the operations comprising:
when a light sensitivity (ISO) of a first camera of a terminal in a current photographing environment is greater than a first threshold, capturing a first image for a first scenario in the current photographing environment by using the first camera, capturing a second image for the first scenario by using a second camera of the terminal, wherein a ratio of the first camera is not less than a ratio of the second camera, and optimizing the first image based on the second image to obtain a third image, wherein when a color of the second image is better than a color of the first image, a color of the third image is better than the color of the first image;

when a contrast of the second image is higher than a contrast of the first image, a contrast of the third image is higher than the contrast of the first image; or when a dynamic range of the second image is larger than a dynamic range of the first image, a dynamic range of the third image is larger than the dynamic range of the first image;

wherein the optimizing the first image based on the second image to obtain the third image comprises:

optimizing the first image by using a second neural network and the second image to obtain the third image, wherein the second neural network is used to perform image style optimization on an image with a poor image style by using an image with a good image style.

\* \* \* \* \*